(12) United States Patent
Kostecki et al.

(10) Patent No.: US 11,845,682 B2
(45) Date of Patent: Dec. 19, 2023

(54) SYSTEMS AND METHODS FOR WATER DESALINATION USING THERMO-RESPONSIVE IONIC LIQUIDS REGENERATED BY SOLAR ENERGY

(71) Applicant: The Regents of the University of California, Oakland, CA (US)

(72) Inventors: Robert Kostecki, Lafayette, CA (US); Ravi S. Prasher, Danville, CA (US); Akanksha K. Menon, Berkeley, CA (US); Andrew Z. Haddad, Berkeley, CA (US); Jeffrey J. Urban, Emeryville, CA (US)

(73) Assignee: the Regents of the University of California, Oakland, CA (US)

( * ) Notice: Subject to any disclaimer, the term of this patent is extended or adjusted under 35 U.S.C. 154(b) by 0 days.

(21) Appl. No.: 17/370,379

(22) Filed: Jul. 8, 2021

(65) Prior Publication Data
US 2022/0009813 A1    Jan. 13, 2022

Related U.S. Application Data

(60) Provisional application No. 63/050,359, filed on Jul. 10, 2020.

(51) Int. Cl.
*C02F 9/00* (2023.01)
*B01D 61/00* (2006.01)
(Continued)

(52) U.S. Cl.
CPC .............. *C02F 9/00* (2013.01); *B01D 61/005* (2013.01); *B01D 61/027* (2013.01); *B01D 61/04* (2013.01);
(Continued)

(58) Field of Classification Search
CPC .... C02F 9/00; C02F 1/001; C02F 1/02; C02F 1/442; C02F 1/445; C02F 2103/10;
(Continued)

(56) References Cited

U.S. PATENT DOCUMENTS

2012/0024365 A1* 2/2012 Branz ................. F24D 11/0221
136/256
2014/0305425 A1* 10/2014 Prutsman ................ F24S 25/20
126/635

FOREIGN PATENT DOCUMENTS

CN    103344047 A  * 10/2013
CN    111087044 A  *  5/2020

OTHER PUBLICATIONS

Abdullah et al, Journal of Engineering Science and Technology vol. 14, No. 2 (2019) 1031-1042 (Year: 2019).*
(Continued)

*Primary Examiner* — Pranav N Patel

(57) ABSTRACT

This disclosure provides systems, methods, and apparatus related to water desalination. In one aspect, a method includes generating a diluted draw solution using forward osmosis. Wastewater is on a first side of an osmotic membrane and a draw solution is on a second side of the osmotic membrane. The draw solution comprises a mixture of water and an ionic liquid. Water in the wastewater diffuses across the osmotic membrane to the draw solution to form the diluted draw solution. The diluted draw solution is heated using a photonic heater to a temperature above a lower critical solution temperature (LCST) of the ionic liquid to phase separate the diluted draw solution into the ionic liquid and treated water.

20 Claims, 17 Drawing Sheets

(51) Int. Cl.
| | |
|---|---|
| *B01D 61/04* | (2006.01) |
| *C02F 1/44* | (2023.01) |
| *B01D 61/02* | (2006.01) |
| *B01D 61/58* | (2006.01) |
| *C02F 1/02* | (2023.01) |
| *C02F 1/00* | (2023.01) |
| *C02F 103/10* | (2006.01) |

(52) U.S. Cl.
CPC .......... *B01D 61/58* (2013.01); *B01D 2311/04* (2013.01); *B01D 2311/06* (2013.01); *B01D 2311/2649* (2013.01); *C02F 1/001* (2013.01); *C02F 1/02* (2013.01); *C02F 1/442* (2013.01); *C02F 1/445* (2013.01); *C02F 2103/10* (2013.01); *C02F 2301/046* (2013.01); *C02F 2303/16* (2013.01)

(58) Field of Classification Search
CPC ........... C02F 2301/046; C02F 2303/16; B01D 61/005; B01D 61/027; B01D 61/04; B01D 61/58; B01D 2311/04; B01D 2311/06; B01D 2311/2649; B01D 2311/103; B01D 2311/22; B01D 2311/2646; Y02A 20/131; Y02W 10/37
See application file for complete search history.

(56) References Cited

OTHER PUBLICATIONS

B.D. Coday et al. / Desalination 333 (2014) 23-35. (Year: 2014).*
English language machine translation of CN103344047A, 3 pages, No Date.*
English language machine translation of CN111087044A, 6 pages, No Date.*
Jitendra K Pradhan et al 2017 J. Phys. D: Appl. Phys. 50 245104. (Year: 2017).*
Cai et al., "Energy-efficient desalination by forward osmosis using responsive ionic liquid draw solutes†," Environmental Science: Water Research and Technology, vol. 1, pp. 341-347, (Feb. 11, 2015).
Kim et al., "Combined organic and colloidal fouling in forward osmosis: Fouling reversibility and the role of applied pressure," Journal of Membrane Science, vol. 460, pp. 206-212, (Jun. 15, 2014).
Tow et al., "Unpacking compaction: Effect of hydraulic pressure on alginate fouling," Journal of Membrane Science, vol. 544, pp. 221-233, (Dec. 15, 2017).
Tow et al., "Comparison of fouling propensity between reverse osmosis, forward osmosis, and membrane distillation," Journal of Membrane Science, vol. 556, pp. 352-364, (Jun. 15, 2018).
Boo et al., "Membrane-less and Non-Evaporative Desalination of Hypersaline Brines by Temperature Swing Solvent Extraction," Environmental Science & Technology Letters, vol. 6, No. 6. pp. 359-364, (Apr. 30, 2019).
Shaffer et al., "Forward osmosis: Where are we now?," Desalination, vol. 356, pp. 271-284, (Jan. 15, 2015).
McCutcheon et al., "A novel ammonia—carbon dioxide forward (direct) osmosis desalination process," Desalination, vol. 174, No. 1, pp. 1-11, (Apr. 2005).
McGinnis et al., "Energy requirements of ammonia-carbon dioxide forward osmosis desalination," Desalination, vol. 207, Issues 1-3, pp. 370-382, (Mar. 10, 2007).
McGinnis et al., "Pilot demonstration of the NH3/CO2 forward osmosis desalination process on high salinity brines," Desalination, vol. 312, pp. 67-74, (Mar. 1, 2013).
Kim et al., "Operation and simulation of pilot-scale forward osmosis desalination with ammonium bicarbonate," Chemical Engineering Research and Design, vol. 94, pp. 390-395, (Feb. 2015).
Kohno et al., "Ionic liquid/water mixtures: from hostility to conciliation†," Chemical Communications, vol. 48, pp. 7119-7130, (May 14, 2012).
Kamio et al., "Fundamental investigation of osmolality, thermoresponsive phase diagram, and water-drawing ability of ionic-liquid-based draw solution for forward osmosis membrane process," Journal of Membrane Science, vols. 670-571, pp. 93-102, (Jan. 15, 2019).
Dutta et al., "Prospect of ionic liquids and deep eutectic solvents as new generation draw solution in forward osmosis process," Journal of Water Process Engineering, vol. 21, pp. 163-176, (Feb. 2018).
Hsu et al., "Enhanced Forward Osmosis Desalination with a Hybrid Ionic Liquid/Hydrogel Thermoresponsive Draw Agent System," ACS Omega, vol. 4, No. 2, (Feb. 27, 2019).
Stone et al., "Switchable polarity solvents as draw solutes for forward osmosis," Desalination, vol. 312, pp. 124-129, (Mar. 1, 2013).

* cited by examiner

SYSTEMS AND METHODS FOR WATER DESALINATION USING THERMO-RESPONSIVE IONIC LIQUIDS REGENERATED BY SOLAR ENERGY

RELATED APPLICATIONS

This application claims priority to U.S. Provisional Patent Application No. 63/050,359, filed Jul. 10, 2020, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to water desalination and more particularly to water desalination using an ionic liquid.

BACKGROUND

Global water demand is projected to increase by 55% over the next three decades owing to population growth, industrialization, and climate change. Desalination technologies can meet this demand by extracting clean water from non-traditional saline sources such as produced waters, which are a byproduct of oil and gas extraction. In the United States, nearly one million oil and gas wells generate ~2.4 billion gallons of water per day—this is largely disposed by deep-well injection and represents an under-utilized water resource. However, produced waters and other concentrated brines pose technical challenges for state-of-the-art desalination technologies that have been optimized for seawater as the feed. For instance, membrane-based processes such as reverse osmosis (RO) that are driven by high-grade electrical energy are not suitable since the osmotic pressure of produced water and other complex brines often exceeds the allowable pressure of commercial RO membrane modules. Furthermore, these feeds have a high fouling propensity that may require pre-treatment and membrane maintenance and/or replacement during operation.

Other technologies for produced water desalination include thermal techniques such as multi-stage flash (MSF) and multi-effect distillation (MED), but these systems rely on a liquid-vapor phase change driven by high-temperature heat that is thermodynamically constrained by the large enthalpy of vaporization of water (~2400 J $g^{-1}$). As a result, energy alone can account for ~50% of the product water cost, which limits the treatment of these non-traditional sources. Thus, minimizing the energy consumption of desalination is important, particularly given the interdependence between water and energy.

SUMMARY

One innovative aspect of the subject matter described in this disclosure can be implemented in a system including a forward osmosis apparatus including an osmotic membrane and a thermal separator including a photonic heater. The forward osmosis apparatus is operable to treat wastewater with the wastewater on a first side of the osmotic membrane and a draw solution on the second side of the osmotic membrane. The draw solution comprises a mixture of water and an ionic liquid. Water in the wastewater diffuses across the osmotic membrane to the draw solution to form a diluted draw solution. The thermal separator is coupled to the forward osmosis apparatus to receive the diluted draw solution. The thermal separator is operable to heat the diluted draw solution with the photonic heater above a lower critical solution temperature (LCST) of the ionic liquid to phase separate the diluted draw solution into the ionic liquid and treated water.

Another innovative aspect of the subject matter described in this disclosure can be implemented in a method including generating a diluted draw solution using forward osmosis. Wastewater is on a first side of an osmotic membrane and a draw solution is on a second side of the osmotic membrane. The draw solution comprises a mixture of water and an ionic liquid. Water in the wastewater diffuses across the osmotic membrane to the draw solution to form the diluted draw solution. The diluted draw solution is heated using a photonic heater to a temperature above a lower critical solution temperature (LCST) of the ionic liquid to phase separate the diluted draw solution into the ionic liquid and treated water.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2A shows binodal phase diagrams that show the LCST and FIG. 2B shows the viscosity. FIG. 2C shows the osmolality and the calculated osmotic pressure.

FIG. 3A shows osmolality measured as a function of molality using a vapor pressure method showing differences between ILs and NaCl in solution. FIG. 3B shows the results of a molecular dynamics simulation showing the number of water molecules in the first coordination shell per ion pair of DMBS (line graph) and the ratio of water molecules contributing to their shells (area graph). FIG. 3C shows the results of a molecular dynamics simulation showing the apparent free cation and anion ratio for DMBS compared to experimental data under two assumptions. FIG. 3D shows the results of a molecular dynamics simulation showing the apparent free ion ratio for DMBS and TFA compared to experimental data under the hypothesis that water molecules contribute to the osmotic strength of the nearest ion only.

FIG. 4A shows a schematic of the experimental FO setup used to evaluate the water flux for different feed and draw solutions. The membrane is oriented such that the active layer faces the draw in all experiments. FIG. 4B shows the measured water flux (liter/m²/h-LMH) and the reverse solute flux (gMH) when using 0.6 M NaCl, 70% DMBS, and 70% TFA as draw solutes of similar osmotic strength with a DI water feed; γ represents the membrane selectivity and is obtained as a ratio of solute flux to water flux. FIG. 4C shows measured water flux using NaCl equivalents (0.35 M NaCl, 0.5 M NaCl) of produced water, as well as real produced water samples (Elk Hills, South Mountain) with 70% DMBS and 70% TFA as draw solutes.

FIG. 5A shows optical transmittance of aqueous IL mixtures measured using a 50 μm spacer showing absorption at mid-infrared wavelengths; for larger path lengths ~1 mm, there is complete absorption across the entire IR range. FIG. 5B shows a schematic of a lab-scale setup used for radiative heating of diluted IL mixtures using a photo-thermal converter under a solar simulator output of 1000 W m$^{-2}$. FIG. 5C shows temperature evolution of the diluted DMBS (dashed line) and TFA (solid line) solution, with phase separation caused by radiative heating above their respective LCST. FIG. 5D shows a $^1$H-NMR analysis of the water content of the phase separated layers due to solar heating, with the water-rich layer on top of the IL-rich layer. FIG. 5E shows a lab-scale setup of dead-end nanofiltration for removal of residual IL from the water-rich phase after solar separation. FIG. 5F shows a $^1$H-NMR analysis of the water content of permeate from nanofiltration showing near-perfect rejection of ILs at an applied pressure of 12 bar.

DETAILED DESCRIPTION

Figure 1A:
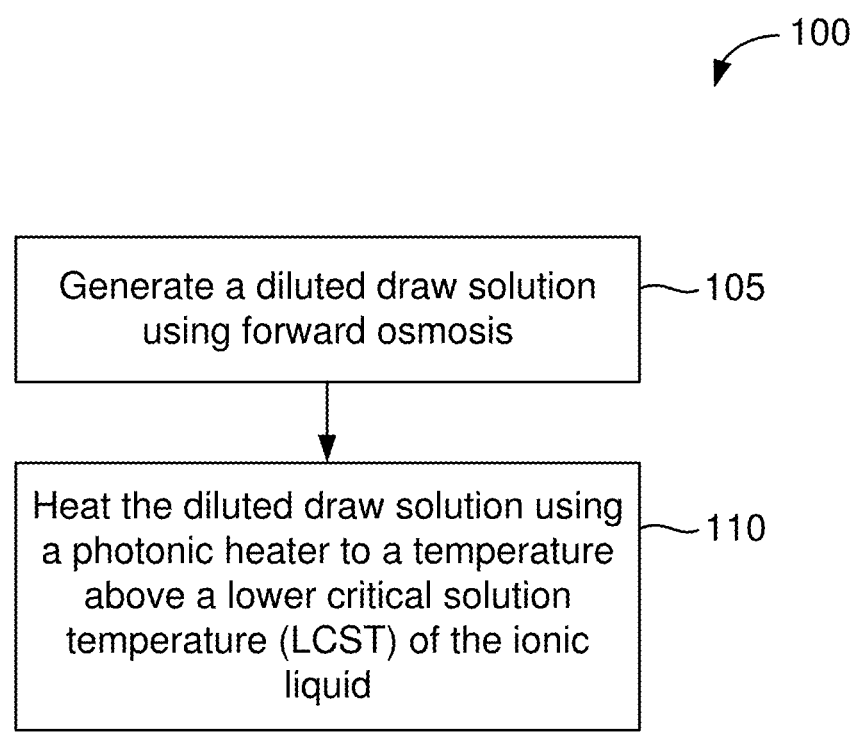
FIG. 1A shows an example of a flow diagram illustrating a process for desalinating water.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

As used herein, wastewater includes industrial water discharges and highly saline water, rather than municipal wastewater/sewage.

Forward osmosis (FO) is a promising technology for desalination of produced waters and high-salinity brines. Recent literature on FO has shown that it exhibits a higher fouling and scaling resistance relative to RO, making it suitable for a wide variety of feeds. The modularity and scalability of FO systems is also advantageous for produced water, as the flow rate and salinity vary significantly between different wells and over the lifetime of a well.

In FO, the osmotic pressure difference between a saline solution (feed) and a higher concentration solution (draw) causes the spontaneous diffusion of water across a semipermeable membrane until osmotic equilibrium is attained by diluting the draw. Traditional draw solutes comprise monovalent or divalent salts (e.g., sodium chloride) that dissociate in aqueous solutions to generate large osmotic pressures at high molar concentrations. However, osmotic strength is not the only factor for draw selection, as FO requires a second step that regenerates the draw and produces clean water. This draw regeneration step requires an energy input—for example, sodium chloride draw solutes can be recovered either via thermal evaporation that requires ~2400 J g$^{-1}$, or via membrane-based RO that requires more electrical energy than direct treatment (i.e., RO without FO) of the same feed. These large energetic inputs for draw regeneration often preclude FO as a desalination technology. Thus, identifying an appropriate draw that satisfies both criteria of high osmotic pressure for water flux, as well as energy-efficient draw regeneration, represents a need for the application of FO desalination.

To address this, previous researchers introduced thermolytic draws based on ammonium bicarbonate salts that are thermally regenerated using vacuum distillation at ~60° C. due to the preferentially removal of ammonia and carbon dioxide gas from water. Despite extensive investigations at the lab-scale and pilot-scale, a high reverse solute flux (RSF) which results in draw solute loss over time (3-10× more than NaCl) and the generation of ammonia-containing product water have limited its use. Nevertheless, this work led to new draw solutes that themselves can be thermally regenerated, thereby overcoming the energy bottleneck associated with vaporizing water.

One such class of novel materials is thermo-responsive ionic liquids (ILs). Aqueous mixtures of these ILs exhibit a liquid-liquid phase separation upon heating above a critical temperature (lower critical solution temperature, or LCST) owing to a negative entropy of mixing. Although originally developed for the extraction of proteins from aqueous solutions, the inherent ionic state of these organic salts generates high osmotic pressures in solution that has enabled their use as draws for FO. The energy required to separate water from these ILs (i.e., the enthalpy of de-mixing) is ~10 J g$^{-1}$, thereby allowing for low energy recovery compared to other materials that can be thermally regenerated. As a result, these draw solutions can be coupled with inexpensive forms of energy such as low-grade heat or solar energy, which in turn significantly reduces secondary energy use, greenhouse gas emissions, and the overall cost of water treatment.

Despite these advantages, significant challenges remain before IL-based FO can become a viable technology for desalination. One shortcoming in literature is the design of a system that includes both a draw dilution and thermal regeneration process that is continuous and utilizes a practical/scalable heat source. Furthermore, for IL-based FO to be economical, it is critical to demonstrate their desalination performance with real produced water samples or brine feeds, as well as assess their performance and compatibility with commercially available polymeric membranes. Selection of suitable ILs based on overall system design has the potential to minimize energy and capital cost, and this suggests the need to develop a framework for draw selection that optimizes multiple material parameters (e.g., LCST, osmotic pressure, viscosity, heat absorption). To this end, it is important to measure and obtain a mechanistic understanding of IL-water mixture properties as a function of concentration (and temperature, when applicable).

Described herein is IL-based FO desalination that operates continuously using only renewable energy, i.e., a solar input, for draw regeneration. We demonstrate a design concept comprising LCST-type ILs that desalinate real produced water feeds when coupled to a solar energy harvester that provides heat for draw regeneration and clean water production. It should be noted that it is important here is to efficiently harness sunlight to induce effective phase separation of the IL-water mixture. However, given that water is largely transparent at solar wavelengths and absorbs strongly in the infrared, it is expected that these water-based IL mixtures will also exhibit similar properties. With this in mind, a photo-thermal converter (aka a photonic heater) was designed that converts unconcentrated solar energy (i.e., without an optical concentrator) into infrared heat, which is directly absorbed by the IL-water mixture. This enables radiative or non-contact heating of the draw above its LCST for phase separation, thereby eliminating the need for a heat exchanger and/or heat transfer fluid to heat the draw.

FIG. 1A shows an example of a flow diagram illustrating a process for desalinating water. Starting at block 105 of the method 100 shown in FIG. 1A, a diluted draw solution is generated using forward osmosis. In this process, the wastewater is on a first side of an osmotic membrane and a draw solution on a second side of the osmotic membrane. The draw solution comprises a mixture of water and an ionic liquid. Due to the low concentration of water in the draw solution, water in the wastewater diffuses across the osmotic membrane to the draw solution to form the diluted draw solution.

In some embodiments, the wastewater comprises produced water generated by an oil extraction process or a gas extraction process. In some embodiments, the wastewater has a salinity higher than the salinity of salt water from the Pacific Ocean or the Atlantic Ocean. In some embodiments, the wastewater has a salinity of about 1000 ppm to 40,000 ppm (or milligrams per liter (mg/L)) or about 1000 ppm to 50,000 ppm. In some embodiments, the wastewater has a salinity of about 1000 ppm to 80,000 ppm.

In some embodiments, the osmotic membrane comprises a semi-permeable membrane. In some embodiments, the osmotic membrane comprises a selective layer and a support layer.

In some embodiments, the draw solution at block 105 has a weight percentage of the ionic liquid of about 10% to 90%, about 60% or greater, about 70% or greater, or about 90%. In some embodiments, the diluted draw solution generated at block 105 has a weight percentage of the ionic liquid of about 30% to 50%, about 40% to 50%, about 65% to 75%, or about 70%.

Returning to the method 100 shown in FIG. 1A, at block 110 the diluted draw solution is heated using a photonic heater to a temperature above a lower critical solution temperature (LCST) of the ionic liquid. When the diluted draw solution is heated above the LCST, the ionic liquid phase separates into the ionic liquid and treated water. In some embodiments, the diluted draw solution is heated to a temperature of about under 90° C., 50° C. to 60° C., or about 55° C. In some embodiments, the LCST of the ionic liquid is about 30° C. to 60° C., about 30° C. to 40° C., about 31° C. to 37° C., or about 32° C. to 36° C. When direct sunlight (i.e., unconcentrated sunlight) is used, the diluted draw solution can be heated to a temperature of about 50° C. to 60° C. When concentrated sunlight is used (e.g., a lens is used to concentrate sunlight onto the photonic heater), the diluted draw solution can be heated to a higher temperature (e.g., approaching, but not over, 100° C.—it is not desirable to boil the diluted draw solution). In some embodiments, the ionic liquid generated by the phase separation of the diluted draw solution is used as the draw solution in the forward osmosis in block 105.

After the phase separation of the diluted draw solution, the ionic liquid is separated from the treated water. In some embodiments, the method 100 further includes physically separating the ionic liquid and the treated water (e.g., the ionic liquid is in a first container and the treated water is in a second container). For example, in some embodiments, the density of the ionic liquid above the LCST is higher than the density of water. When the diluted draw solution is phase separated into the ionic liquid and treated water, the treated water floats on top of the ionic liquid. When the diluted draw solution is phase separated in this manner, the treated water can be poured or removed from the top of a container containing the diluted draw solution and the ionic liquid can flow out of an open valve in the bottom of the container. This physically separates the treated water and the ionic liquid. In some embodiments, the ionic liquid is separated from the treated water using a colescer or an electrocoalescer.

The treated water may include a small amount of residual ionic liquid. The treated water can be used for agricultural irrigation, for example. The ionic liquid can be used as the draw solution in the forward osmosis at block 105.

An ionic liquid is a salt that is a liquid at temperatures below about 100° C. or even at room temperature (room temperature is generally taken to be about 20° C. to 25° C.). In some embodiments, the lower critical solution temperature of the ionic liquid is under about 70° C. In some embodiments, the ionic liquid is not toxic to humans. This means that humans will not be harmed by ingesting treated water or by ingesting treated water that has been further purified that may still contain some ionic liquid molecules.

In some embodiments, a mixture of the ionic liquid and water (e.g., the draw solution and the diluted draw solution) has a low viscosity such that it can be easily pumped through tubes or pipes of a system operable to perform the method 100. In some embodiments, the mixture of the ionic liquid and water has a viscosity of about 1 milliPascal-second (mPa-s) to 20 mPa-s (or centipoise (cP)). In some embodiments, the ionic liquid includes functional groups that absorb the wavelengths of infrared radiation generated by the photonic heater. In some embodiments, the ionic liquid is an ammonium-based ionic liquid, a phosphonium-based ionic liquid, or a mixture thereof. In some embodiments, the ionic liquid is selected from a group consisting of $P_{4444}$DMBS, $P_{4444}$-VBS, $P_{4444}$-TFA, $P_{4444}$-TMBS, $P_{4444}$-Tos, $P_{4444}$-salicyl, $N_{4444}$-TFA, $N_{4444}$-TMBS, $N_{4444}$-salicyl, and mixtures thereof. In some embodiments, the ionic liquid is selected from a group consisting of tetrabutylphosphonium 2,4-dimethylbenzene sulfonate ($P_{4444}$DMBS), tetrabutylphosphonium trifluoroacetate ($P_{4444}$TFA), ammonium 2,4-dimethylbenzene sulfonate ($N_{4444}DMBS$), ammonium trifluoroacetate ($N_{4444}TFA$), and mixtures thereof. In some embodiments, the ionic liquid is a mixture of $P_{4444}$-TFA and $N_{4444}TFA$. In some embodiments, the mixture the ionic liquid in water is about 30 wt. % $P_{4444}$-TFA and about 40 wt. % $N_{4444}TFA$ in water. In some embodiments, the ionic liquid is $P_{4444}$-TFA. In some embodiments, the mixture the ionic liquid in water is about 70 wt. % $P_{4444}$-TFA in water or about 90 wt. % $P_{4444}$-TFA in water.

In some embodiments, the photonic heater converts solar radiation into infrared radiation of specific wavelengths for heating the diluted draw solution. This is heating by direct radiative heating; i.e., a non-contact method of heating. In some embodiments, the specific wavelengths are wavelengths at which the dilute draw solution absorbs the infrared radiation.

In some embodiments, the method 100 shown in FIG. 1A further comprises filtering the wastewater prior to block 105. Filtering the wastewater serves to remove solids suspended in the wastewater. This may aid in preventing solids from blocking pores in the osmotic membrane. In some embodiments, filtering the wastewater is performed using vacuum filtration.

In some embodiments, the method 100 shown in FIG. 1A further comprises filtering treated water after block 110 to remove residual ionic liquid from the treated water. In some embodiments, the treated water is filtered using a nanofiltration membrane. In some embodiments, water molecules can pass through the nanofiltration membrane but molecules of the ionic liquid cannot. In some embodiments, a pressure of about 5 bar to 15 bar, or about 10 bar, or about 12 bar, is used to push the treated water through the nanofiltration membrane. In some embodiments, the nanofiltration membrane comprises a polyamide film. In some embodiments, the residual ionic liquid is added to the ionic liquid generated at block 110.

Figure 1B:
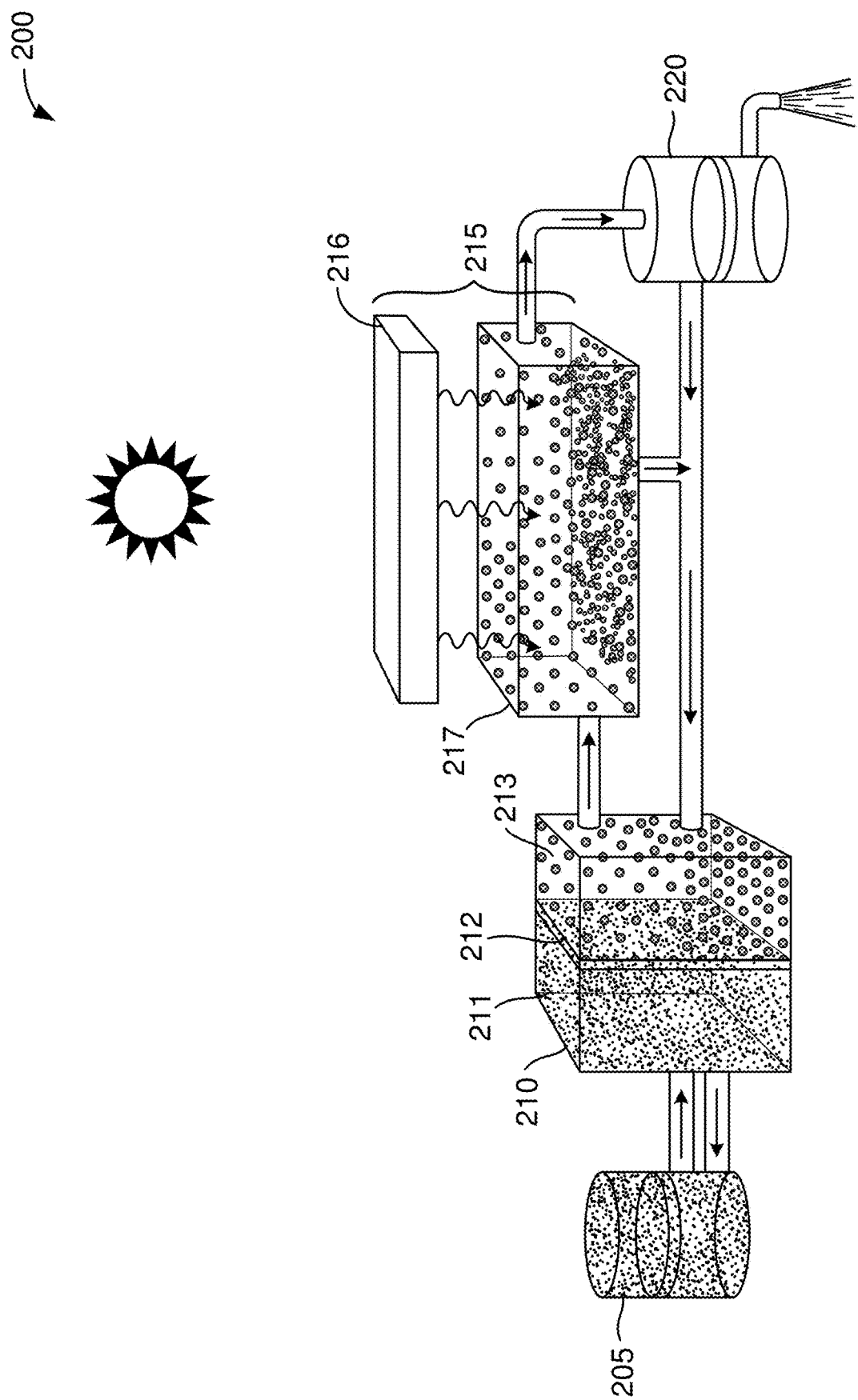
FIG. 1B shows an example of a schematic illustration of a system operable to desalinate water.

FIG. 1B shows an example a schematic illustration of a system operable to desalinate water. Embodiments of the system 200 shown in FIG. 1B can be used to perform embodiments of the method 100 shown in FIG. 1A. Not shown in FIG. 1B are pumps that may be positioned at different points in the system 200 to transport a liquid to different apparatus of the system 200. Also not shown are heat exchanges coupled to the system 200 to cool the wastewater and the draw solution at a specified temperature during the forward osmosis operation. In some embodiments, the heat exchangers cool both the wastewater and the draw solution to about 25° C. Further, the connections shown among the different apparatus of the system 200 comprises pipes or tubes operable to transport a liquid to or from different apparatus of the system 200; i.e., the different apparatus of the system 200 are in fluid communication as shown in FIG. 1B.

In some embodiments, the system 200 includes a filtration apparatus 205, a forward osmosis apparatus 210, a thermal separator 215, and a nanofiltration apparatus 220. The filtration apparatus 205 is coupled to the forward osmosis apparatus 210. The filtration apparatus 205 is operable to filter the wastewater before it is transported to the forward osmosis apparatus 210. Filtering the wastewater removes solids that may be suspended in the wastewater and can prevent blocking pores in an osmosis membrane 212 in the forward osmosis apparatus 210.

The forward osmosis apparatus 210 includes the osmotic membrane 212. The forward osmosis apparatus 210 is operable to treat the wastewater. The wastewater is on a first side 211 of the osmotic membrane 212 and a draw solution on the second side 213 of the osmotic membrane 212. The draw solution comprises a mixture of water and an ionic liquid. In this configuration, water in the wastewater diffuses across the osmotic membrane 212 to the draw solution to form a diluted draw solution. As shown in FIG. 1B, in some embodiments, wastewater with concentrated salts on the first side 211 of the osmotic membrane 212 is mixed with filtered wastewater from the filtration apparatus 205.

In some embodiments, the osmotic membrane 212 comprises a semi-permeable membrane. In some embodiments, the osmotic membrane 212 comprises a selective layer and a support layer. The selective layer blocks salts and other contaminates. The selective layer is selectively permeable only to water. In some embodiments, the selective layer is about 100 nanometers (nm) thick. In some embodiments, the selective layer is a polyamide layer. In some embodiments, the support layer is about 50 microns thick or greater than about 20 microns thick. In some embodiments, the support layer is a micro-porous polymeric layer.

The thermal separator 215 includes a photonic heater 216 and a separation vessel 217. The separation vessel 217 is coupled to the forward osmosis apparatus 210 to receive the diluted draw solution. The thermal separator 215 is operable to heat the diluted draw solution with the photonic heater 216 above a lower critical solution temperature (LCST) of the ionic liquid to phase separate the diluted draw solution into the ionic liquid and treated water in the separation vessel 217. In some embodiments, a lens (not shown) is used on concentrate sunlight onto the photonic heater 216. In some embodiments, the separation vessel 217 is coupled to the forward osmosis apparatus 210 to provide the phase separated ionic liquid to be used as the draw solution in the operation of the forward osmosis apparatus 210.

Using a photonic heater 216 provides for a non-contact method of heating the diluted draw solution. The diluted draw solution is heated in the separation vessel 217 by the direct absorption of radiation. In some embodiments, the system 200 does not include a heat exchanger or other apparatus in contact with the diluted draw solution to heat the diluted draw solution.

The nanofiltration apparatus 220 is coupled to the separation vessel 217. The nanofiltration apparatus 220 is operable to receive the treated water and to remove residual ionic liquid from the treated water. In some embodiments, the nanofiltration apparatus 220 includes a nanofiltration membrane 222. In some embodiments, the nanofiltration membrane 222 comprises a polyamide film.

Figure 1C:
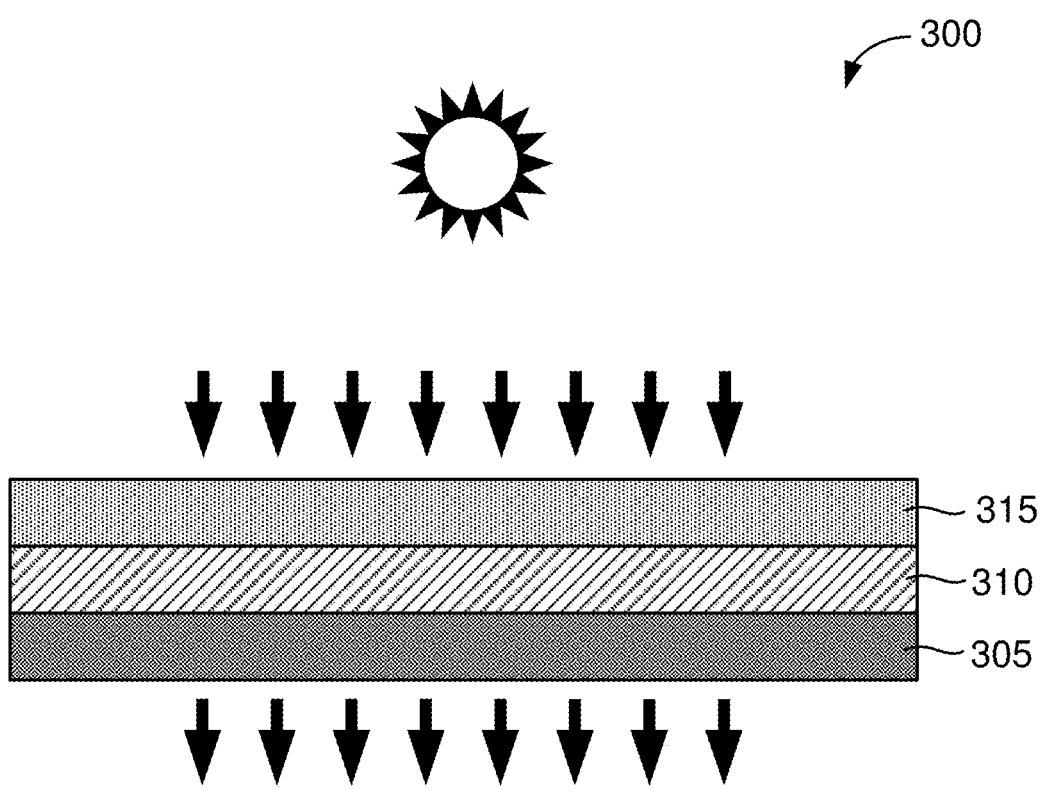
FIG. 1C shows an example of a schematic illustration of a photonic heater.

FIG. 1C shows an example of a schematic illustration of a photonic heater. A photonic heater may be referred to as a photo-thermal converter. The photonic heater 300 shown in FIG. 1C may be used in the method 100 shown in FIG. 1A or with the system 200 shown in FIG. 1B. The photonic heater 300 includes a metal substrate 310, an infrared emitter 305 disposed on a first side of the metal substrate 310, and a solar absorber 315 disposed on a second side of the metal substrate 310. In some embodiments, the metal substrate 310 comprises aluminum or copper. In some embodiments, the metal substrate is about 0.12 millimeters (mm) to 0.75 mm, or about 0.5 mm, thick.

In some embodiments, the infrared emitter 305 is a high temperature (i.e., stable to a temperature of about 400° C.) black paint that has an emissivity of about 0.8 or about 0.9 or greater. In some embodiments, the infrared emitter 305 is about 1 micron to 10 microns, or about 1 micron to 3 microns, thick. In some embodiments, the infrared emitter 305 can be sprayed onto or painted onto the metal substrate 310.

In some embodiments, the solar absorber 315 is a selective solar absorber. In some embodiments, the solar absorber 315 comprises a cermet structure comprising a ceramic matrix with metal nanoparticles embedded in the ceramic matrix. In some embodiments, the solar absorber 315 comprises a multi-layer cermet structure. In some embodiments, the solar absorber 315 has an absorptivity of about 0.9 or about 0.95 or greater. In some embodiments, the solar absorber 315 is about 1 micron to 3 microns thick. In some embodiments, the solar absorber 315 is deposited onto the metal substrate 310 using electron beam vapor deposition or sputtering.

The solar absorber 315 is operable to absorb solar radiation. In some embodiments, the solar absorber 315 absorbs light at wavelengths of about 300 nm to 2.5 microns, or about 300 nm to 1.5 microns. The infrared emitter 305 is operable to emit energy from the absorbed solar radiation in the form of infrared radiation. In some embodiments, the infrared emitter 305 emits radiation at wavelengths of about 3 microns to 10 microns. In some embodiments, the photonic heater operates without a solar concentrator, i.e., under one sun.

Figure 1D:
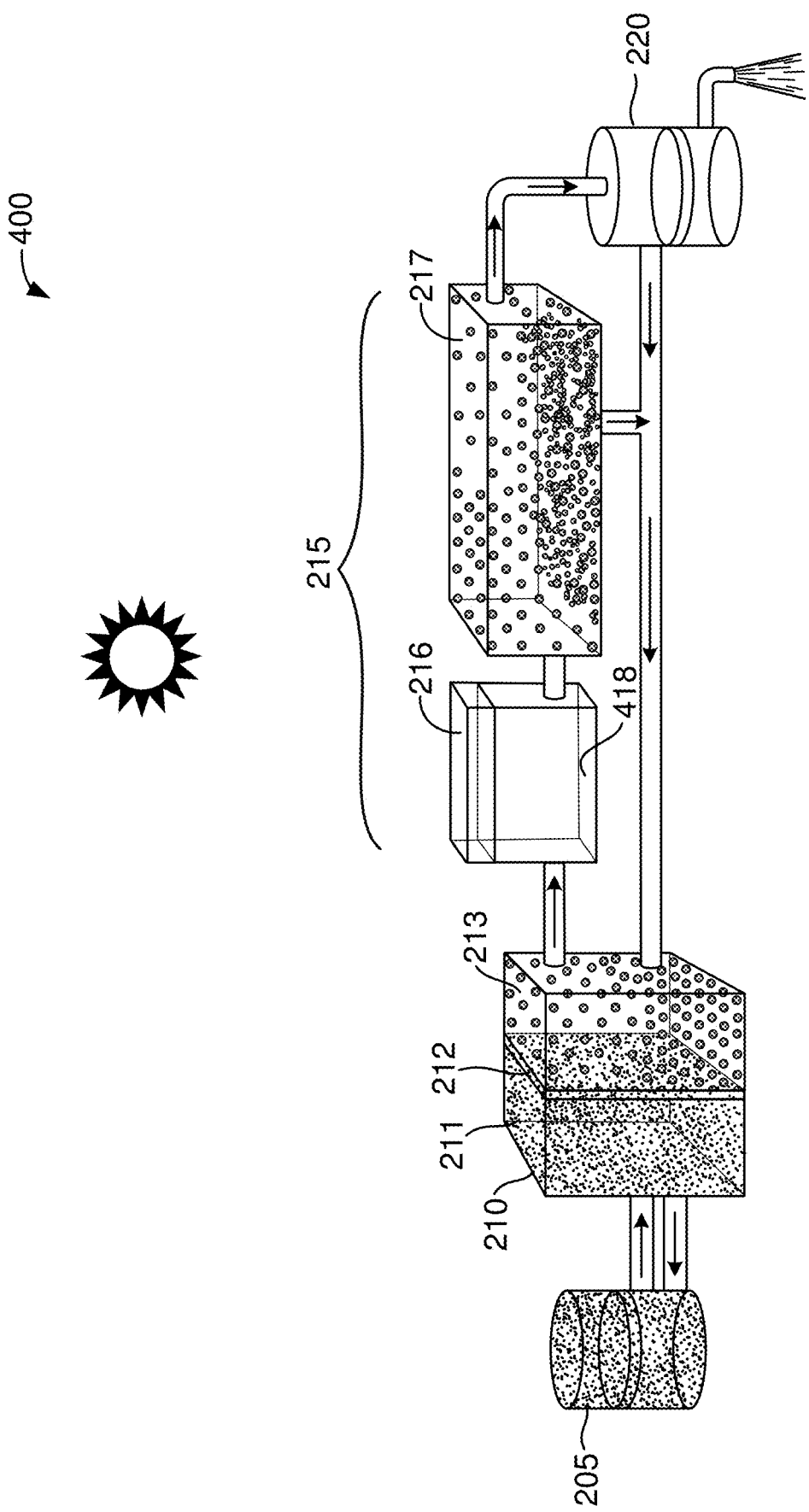
FIG. 1D shows an example of a schematic illustration of a system operable to desalinate water.

FIG. 1D shows an example of a schematic illustration of a system operable to desalinate water. The embodiment of the system 400 shown in FIG. 1D is similar to the embodiment of the system 200 shown in FIG. 1B with the addition of a flow separator 418. As shown in FIG. 1D, the flow separator 418 is coupled to the forward osmosis apparatus 210 to receive the diluted draw solution. The photonic heater 216 is operable to heat the diluted draw solution above a lower critical solution temperature (LCST) of the ionic liquid as it flows through the flow separator 418.

In some embodiments, a serpentine channel defined in the flow separator 418 directs the flow of the diluted draw solution. In some embodiments, the flow of the diluted draw solution in the serpentine channel defined in the flow separator 418 is about perpendicular (e.g., when the sun is directly overhead) to the solar radiation impinging on the diluted draw solution. In some embodiments, the serpentine channel in the flow separator 418 serves to heat the diluted draw solution more quickly and more efficiently than heating the diluted draw solution in the separation vessel 217 as with the system 200 shown in FIG. 1B. Heating a diluted draw solution with a photonic heater is in part governed by the penetration depth of radiation into the diluted draw solution. In some embodiments, the diluted draw solution is heated more quickly in a flow separator 418 compared to heating the diluted draw solution in the separation tank 217 due to a decreased thickness or height of the diluted draw solution and increased residence time as it flows though the flow separator 418.

In some embodiments, the diluted draw solution is contained by the flow separator 418 except for entry and exit ports for the diluted draw solution. In such embodiments, radiation from the photonic heater 216 passes through the top surface of the flow separator 418 before it heats the diluted draw solution. In some embodiments, the flow separator 418 is in contact with the top surface of the photonic heater 216. In some embodiments, the flow separator 418 is not in contact with the top surface of the photonic heater 216.

In some embodiments, the phonic heater serves as the top surface of the flow separator 418 and serves in part to contain the diluted draw solution as it flows through the flow separator 418. In some embodiments, there is not additional material between the photonic heater 216 and the flow separator 418.

After the diluted draw solution is heated in the flow separator 418, the diluted draw solution flows into the separation vessel 217 where the diluted draw solution phase separates into the ionic liquid and treated water. The ionic liquid and the treated water can then be physically separated and directed to the appropriate flows.

In some embodiments, a lens (not shown) is used on concentrate sunlight onto the photonic heater 216. In some embodiments, the separation vessel 217 is coupled to the forward osmosis apparatus 210 to provide the phase separated ionic liquid to be used as the draw solution in the operation of the forward osmosis apparatus 210. In some embodiments, the flow separator comprises an acrylic.

Figure 1E:
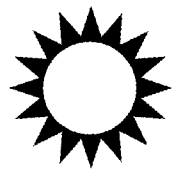
FIG. 1E shows an example of a serpentine channel in a flow separator.
Figure 1E:
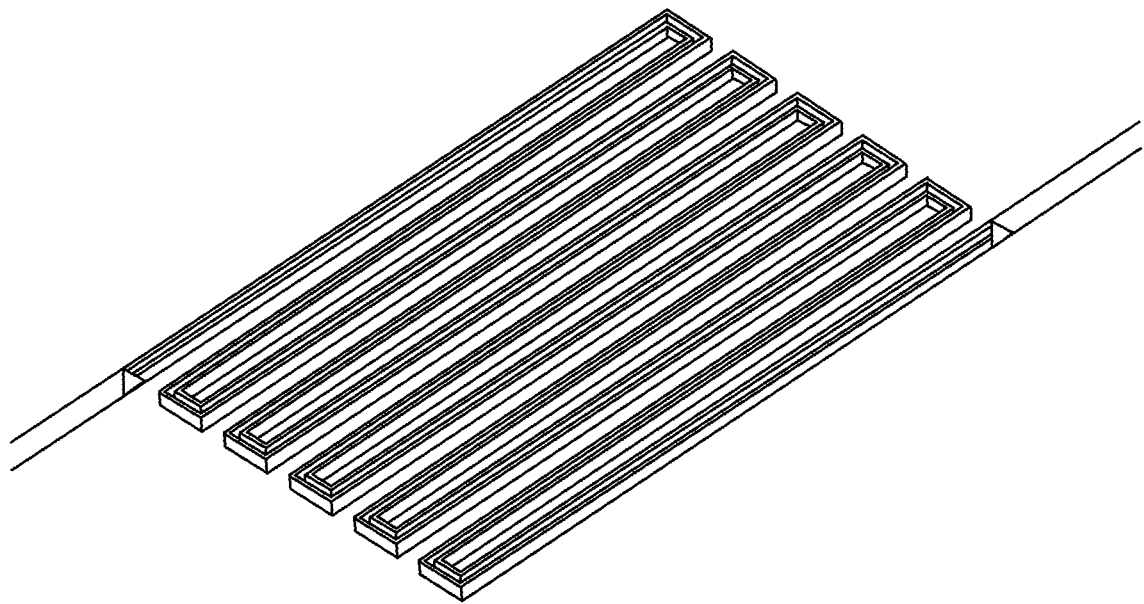

FIG. 1E shows an example of a serpentine channel defined in a flow separator. In some embodiments, the height defined by the serpentine channel (which defines the height of the diluted draw solution as it flows through the flow separator) is about 0.5 centimeters (cm) to 1.5 cm, or about 1 cm. In some embodiments, the length traversed by the serpentine channel is about 7.5 meters (m) to 12.5 m, or about 10 m. That is, if the sections of the serpentine channel were laid out in a straight line, the line would be about 10 meters long. The flow rate of the diluted draw solution in the flow separator can be adjusted such that the diluted draw solution is at a specified temperature (e.g., about 55° C. or higher) when the diluted draw solution exits the flow separator and flows into the separation tank.

Described below are tests performed using produced water samples from oil and gas fields in southern California, as well as commercial FO membranes that are stable over multiple cycles. Overall, this combination of specific ILs that undergo radiative heating for draw regeneration yields a solar-thermal conversion efficiency of 50% under one-sun, thereby enabling energy-efficient and low-cost desalination of complex brines. Furthermore, this work provides a mechanistic understanding of the osmotic pressure of these non-ideal mixtures using Molecular Dynamics, which reveals that aggregation impacts ion hydration in solution. The following examples are intended to be examples of the embodiments disclosed herein, and are not intended to be limiting.

Example—Thermo-Responsive Ionic Liquids as Draw Solutes

While several thermo-responsive ILs have been identified in literature, not all are suitable for solar-driven desalination of produced waters. The performance of such a system is governed by the following solution properties: (i) osmotic strength, (ii) LCST phase transition, (iii) IL-water optical properties, and (iv) viscosity. The osmotic strength and viscosity of aqueous IL solutions are critical parameters for the FO dilution step, while the temperature-dependent phase behavior and optical properties of the IL-water mixtures are key for regeneration via direct absorption of IR radiation. With multiple properties to be optimized and many potential IL chemistries reported in literature, we developed a methodology to select ILs the most suitable ILs for the desalination system. An analytical hierarchy process was used, with phosphonium-based $P_{4444}$DMBS and $P_{4444}$TFA emerging as candidates. These ILs were synthesized via neutralization reactions, and their purity was confirmed by $^1$H-NMR.

Figure 2A:
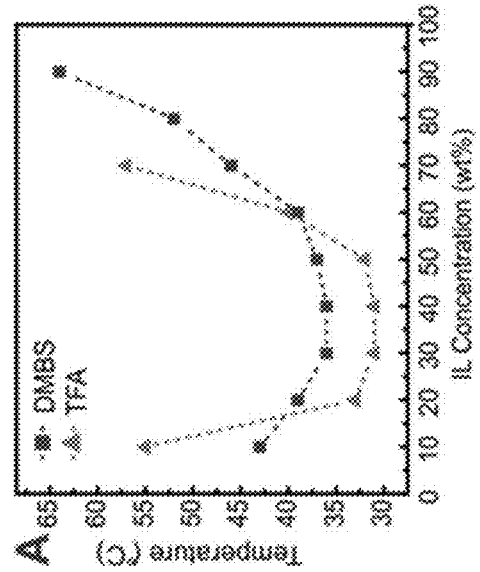
FIGS. 2A-2C show examples of the characterization of aqueous mixtures of DMBS and TFA as a function of their concentration in water.

A binary phase diagram was constructed to determine the LCST of each IL by measuring the optical transmittance as a function of temperature; for a given concentration, phase separation was evidenced by a sharp decrease in transmittance that was recorded as the critical temperature. As shown in FIG. 2A, DMBS displays a broad binodal phase curve, with an LCST of 36° C. at a concentration of 40 wt %, while the TFA curve is symmetric with an LCST of 31° C. at a concentration of 40 wt %. The width of the curve provides insight on the effectiveness of phase separation upon heating—the broad curve for DMBS indicates that at a temperature of say 55° C., the 40 wt % mixture separates into a concentrated IL-rich phase >80 wt %, while TFA at the same concentration and temperature separates into an IL-rich phase of ~70 wt % (based on NMR analysis). This indicates that both draw solutions should be heated not just to their LCST, but to temperatures ~20° C. higher in order to be regenerated and reused in a subsequent FO process, while the product water contains <10 wt % IL. The enthalpy of separation or de-mixing for both ILs, $\Delta H_{mix}$, was obtained from an endothermic peak corresponding to ~2-5 J g$^{-1}$. This separation enthalpy is 1000× lower than the enthalpy of vaporization of water (liquid-vapor transition), which highlights the advantage of using the down-selected ILs undergoing a reversible liquid-liquid phase transition in water.

Figure 2B:
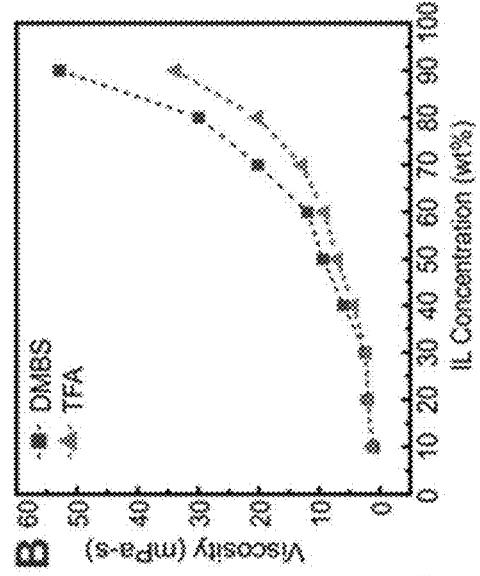

Viscosity of both DMBS and TFA solutions was measured at 25° C. as viscous draws can cause concentration polarization that adversely impacts water flux. Temperature dependence of viscosity is also an important parameter that is often over-looked in literature. Heated IL-water mixtures undergo phase separation that can result in a viscosity increase, which in turn increases pumping requirements and thus energy consumption of the overall system. As shown in FIG. 2B, at concentrations <30 wt % the mixture viscosity is close to that of water (~1 mPa-s) but then increases with concentration, likely due to molecular interactions (e.g., ion pairing and/or molecular aggregation) at these non-dilute concentrations. These molecular interactions also result in an unusual dependence of viscosity on temperature: as the IL-water mixture is heated above room temperature, its viscosity decreases according to the well-known Arrhenius relationship. However, as the critical temperature for a given concentration is approached, viscosity increases sharply, indicating structural reorganization and formation of aggregates in solution that leads to phase separation. With further increase in temperature, viscosity begins to decrease again as the phase-separated water-rich layer resembles a dilute mixture. Similar temperature-dependent viscosity trends have been reported in binary mixtures of water and imidazolium-based ILs that do not display LCST behavior, as well as in LCST-type polymeric mixtures in which aggregation leads to an increase in the effective molecular weight, thereby showing a sharp increase in viscosity with temperature. However, the lower viscosity of our down-selected ILs (at least by a factor of three) at all concentrations, as well as their weaker temperature dependence around the critical temperature, represents significant advantages over other draws.

Figure 2C:
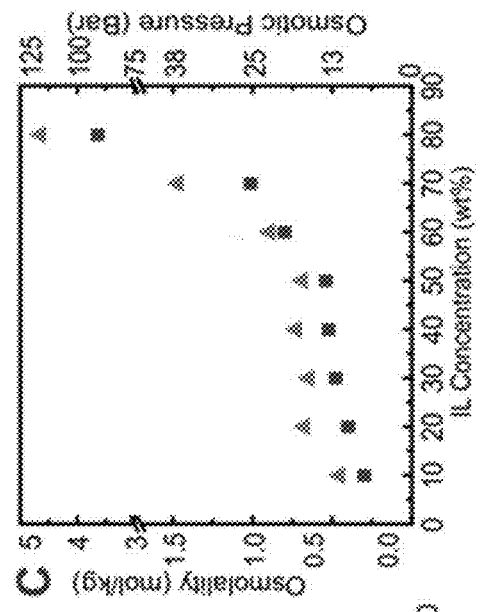

To evaluate the ability of ILs as draw solutes for produced water feeds, the osmotic strength was measured at different concentrations. We note that these measurements were performed at 25° C. (corresponding to the FO temperature); this marks a departure from previous attempts in literature based on freezing point measurements, which result in an over-prediction in osmolality as the physical state of the mixture as well as thermal interactions are altered at low temperatures. FIG. 2C shows the osmolality of both selected ILs, which provides a measure of ions dissolved in solution at a given concentration. These osmolality values (m) were converted into approximate osmotic pressures ($\pi$) using: $\pi = m\rho RT$, where $\rho$ is the density of water, R is the molar gas constant, and T is the absolute temperature. The osmotic pressure of both ILs can be tuned by changing the mixture concentration, rendering them suitable for salinities ranging from brackish water to produced water. At low concentrations <10 wt %, the osmolality of both DMBS and TFA increases linearly, indicating complete dissociation into constituent ions as expected for a dilute aqueous mixture. However, at intermediate concentrations ~20-50 wt %, both ILs appear to have a near-constant osmolality, which increases dramatically upon further increase in concentration >60 wt %.

Figure 3A:
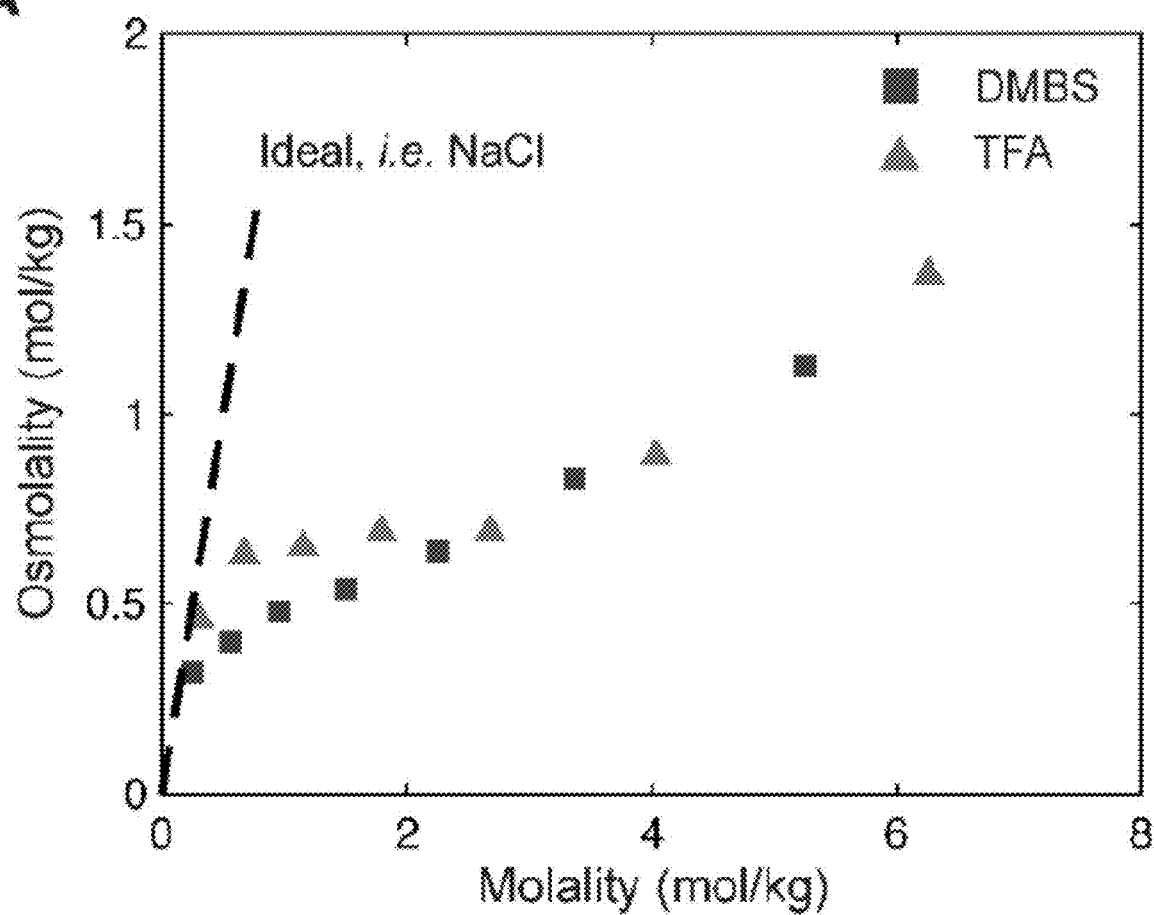
FIGS. 3A-3D show examples of the concentration dependence of osmolality showing deviations from ideal mixtures.

To understand this unusual behavior, osmolality was plotted as a function of mixture molality and compared with an ideal solute like NaCl. As shown in FIG. 3A, above ~0.3 mol kg$^{-1}$, the osmotic pressure generated by IL ions in solution deviates significantly from NaCl dissolved in water. To provide insight on this, Molecular Dynamics (MD) simulations were performed, in which the parameter of interest is the number of water molecules in the first hydration shell of the IL that is known to be a pre-requisite for LCST behavior. The first peak of the radial distribution function between atoms in the IL and water provides information on atoms that constitute hydration shells and their radius—the central P atom in the $P_{4444}$ cation, S atom and benzene ring in the DMBS anion, and the C2 atom in the TFA anion—were pivots for hydration shells.

Figure 3B:
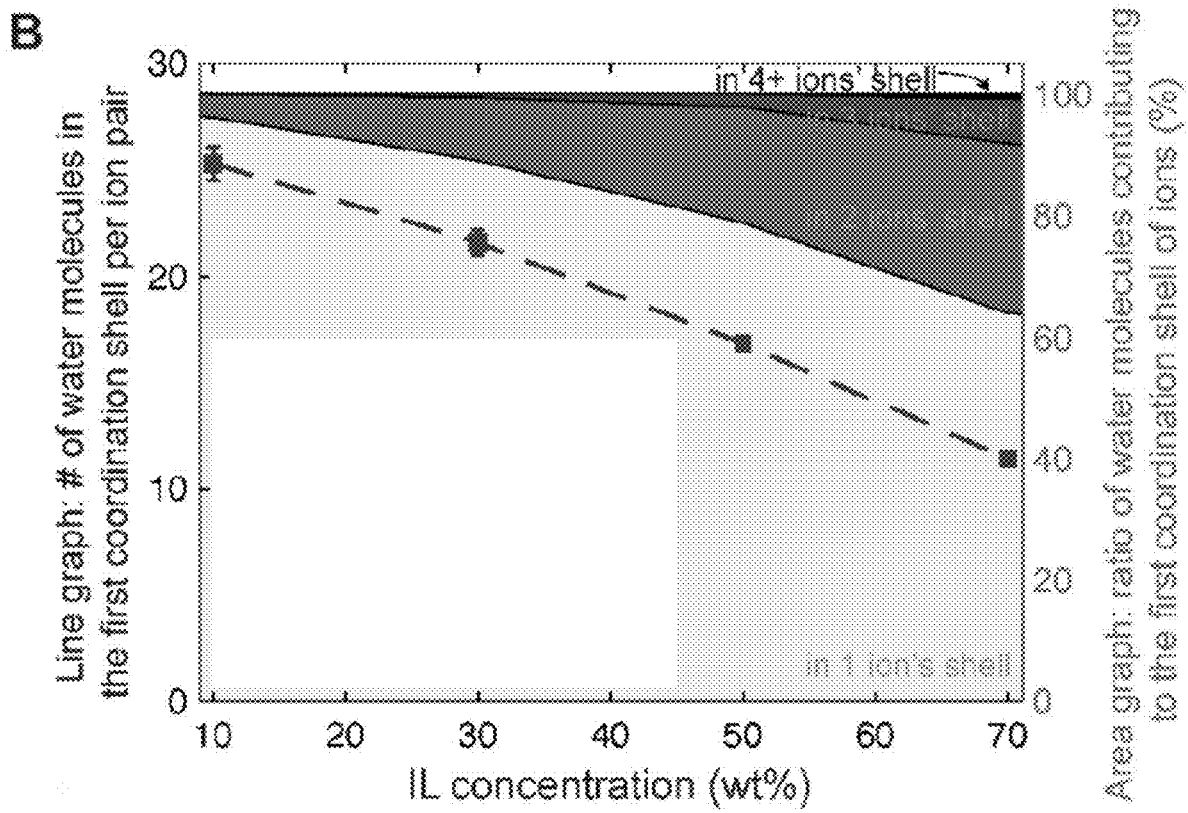

As the IL concentration increases, the number of water molecules inside the first coordination shell per ion pair decreases, as shown in FIG. 3B for DMBS. In other words, it appears that not all ions are hydrated due to an insufficient number of water molecules at these high IL concentrations, resulting in ion aggregation with water molecules being shared by multiple ions. Using MD simulations, the following hypothesis was tested: to contribute to osmotic strength, a certain number of water molecules are required for a given concentration to dissociate the IL into constituent ions (i.e., one cation and one anion per IL molecule). To this end, single cation and anion simulations were performed to calculate the number of water molecules in the ions' first coordination shell that ensure dissociation. Given that water molecules were being shared by multiple ions at some concentrations, two definitions of free ion were evaluated: shared water molecules solvate all ions, or only solvate the nearest ion.

Figure 3C:
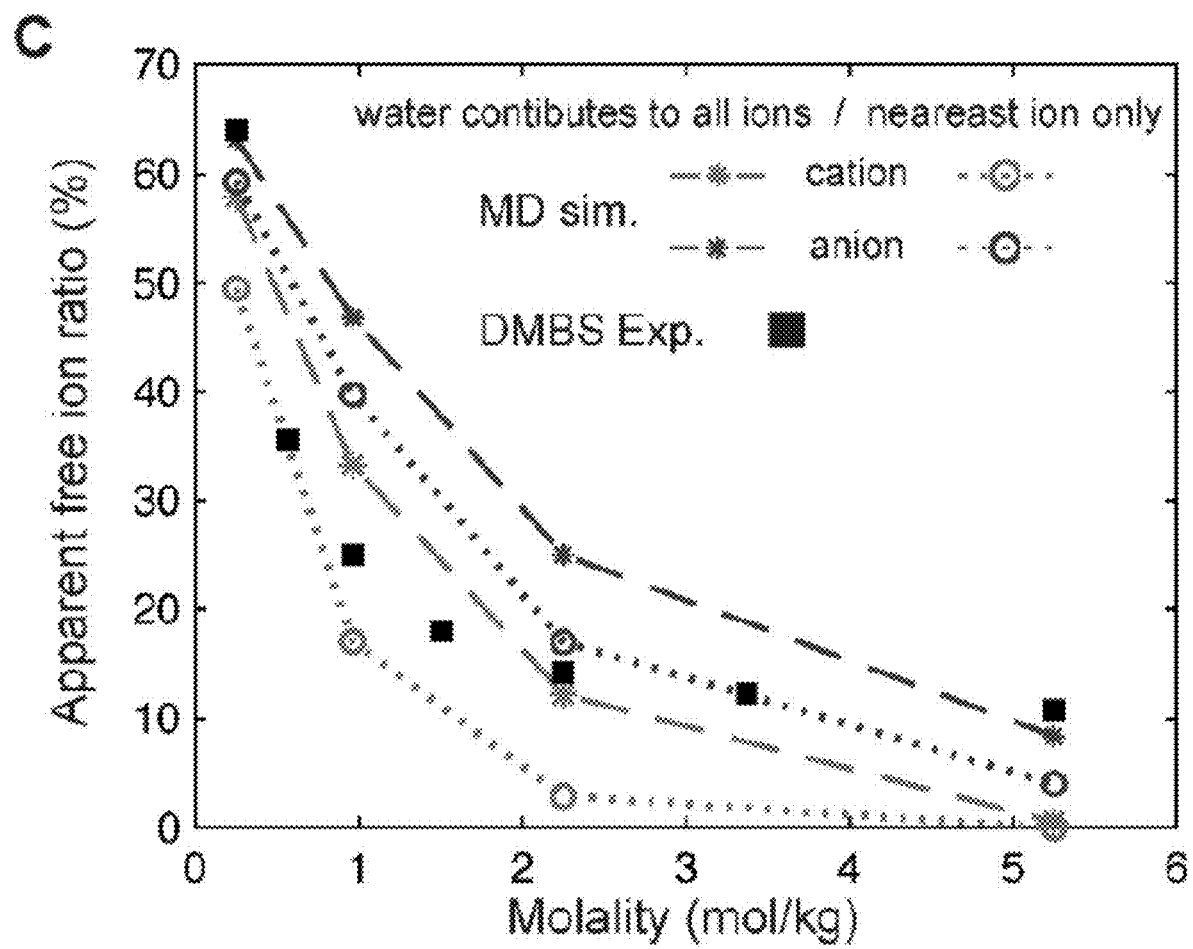

Simulation results for both ionic liquids indicate that the latter definition dominates, i.e., shared water molecules contribute only to the nearest ion, as this correlates well with experimental data, as shown in FIG. 3C for DMBS. The apparent free ion ratio is defined as the ratio of measured osmolality to that predicted by van't Hoff theory for an ideal solute that dissociates into two ions (i.e., like NaCl) in solution. These results indicate that a number of IL ions in solution are clustered, with shared hydration shells solvating only the nearest ion that hinders other ions from contributing to osmotic strength.

Figure 3D:
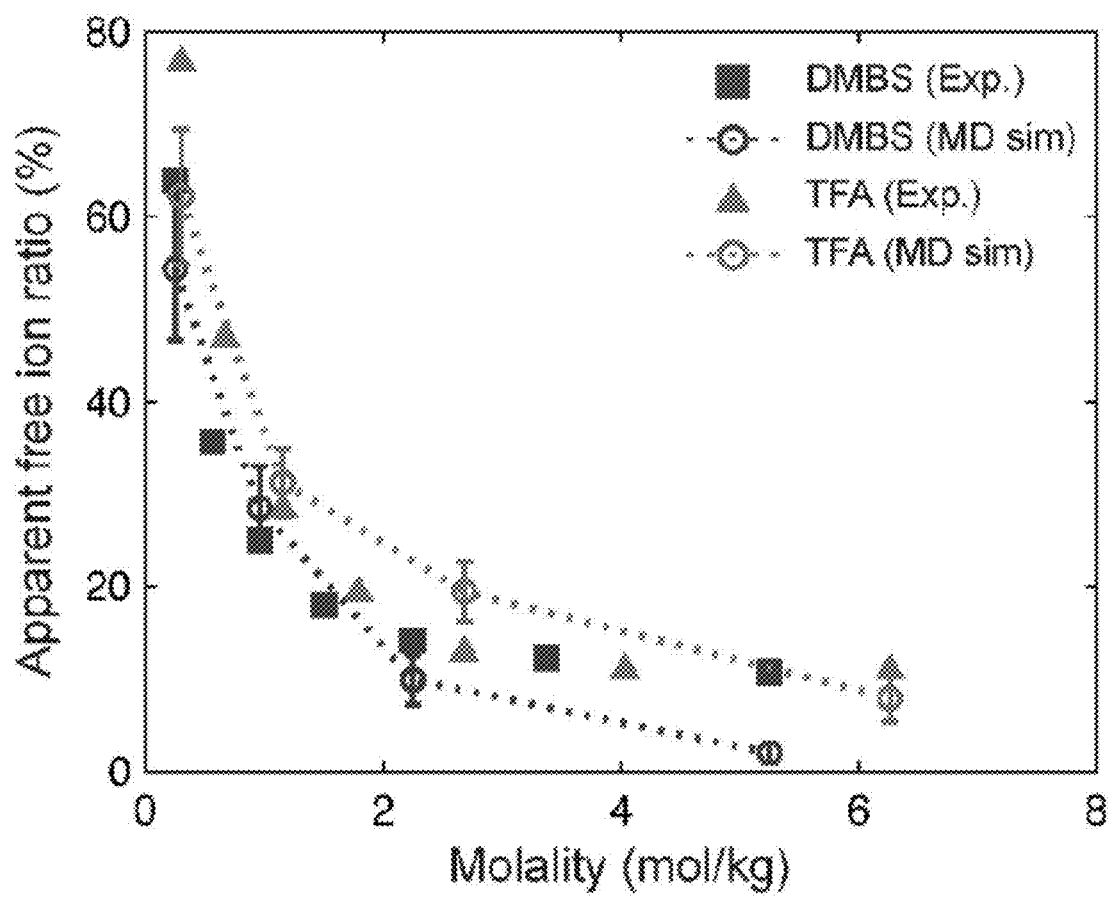

At all concentrations, TFA has a larger free ion ratio than DMBS as shown in FIG. 3D, resulting in a higher osmolality. The osmolality data and MD simulations reveal for the first time, the existence of a critical concentration that is unique to each IL. This is further supported by electrical conductivity values of IL-water mixtures (data not shown) that monotonically increase up to a concentration of ~7.5 wt % and 11 wt % for DMBS and TFA, respectively, and then remain relatively constant until 50 wt %. This concentration represents the point at which IL-water mixtures deviate from ideality and behave like complex fluids, which can have a significant impact on water flux during FO. We have previously shown that ion aggregation is dependent on temperature and is an intermediate step towards LCST-type phase separation, however the occurrence of aggregation at room temperature is revealed for the first time through these MD simulations and indicates an opportunity to develop new IL chemistries. As such, a concentration of 60 wt % or higher is needed for effective desalination using either DMBS or TFA for desalination of high-salinity feeds.

Example—Forward Osmosis Desalination of Produced Waters

Figures 4A, 4B, 4C:
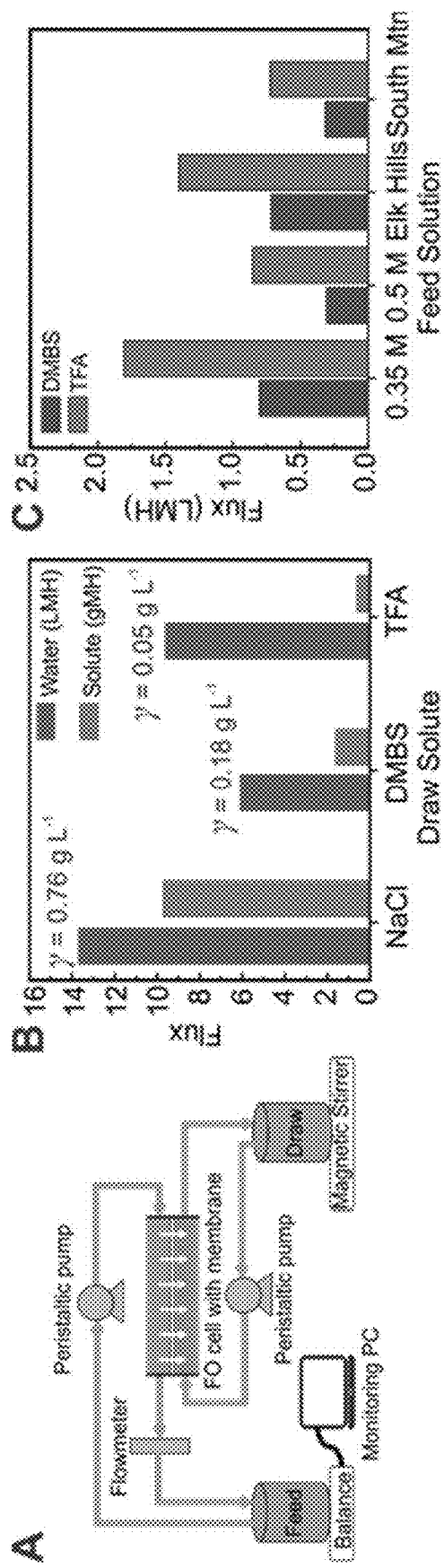
FIGS. 4A-4C show examples of lab-scale forward osmosis experiments.

A lab-scale FO setup comprising a cross-flow cell and a thin film composite membrane was used to test the draw performance of the two IL solutions, as shown in FIG. 4A. Commercially available FO membranes are benchmarked against NaCl draw solutions in terms of their water flux (in $L\,m^{-2}h^{-1}$ or LMH) and reverse solute flux, RSF (in $g\,m^{-2}h^{-1}$ or gMH) with a deionized water feed. RSF is a measure of draw solute back-diffusion through the membrane that gradually lowers draw concentration (and increases feed concentration), thereby decreasing the water flux and requiring periodic draw replenishment that contributes to operational costs. Given that there are significant differences in solution properties of ILs and simple inorganic salts like NaCl, their compatibility with these polymeric membranes is expected to have an impact on performance.

To evaluate the selectivity of commercial FO membranes with the selected ILs, 70 wt % DMBS and TFA draw solutions were used, and comparisons were made with a NaCl solution of similar osmotic strength (0.6 M). FIG. 4B shows the measured water flux when using these three different draws with a DI water feed, and the corresponding RSF. Variations in water flux despite a similar osmotic driving force may be attributed either to interactions between the polymeric membrane and IL (e.g., differences in membrane wettability compared to NaCl) or their higher viscosity and diffusivity. The membrane selectivity (γ) is obtained as the ratio of reverse solute flux to water flux through the membrane. Both IL-based draws show γ values of 0.18 and 0.05 $g\,L^{-1}$, which are lower than NaCl (0.76 $g\,L^{-1}$) and also significantly lower than other thermally regenerated draws such as ammonia-carbon dioxide (γ>2 $g\,L^{-1}$). These results confirm that commercial membranes show a high selectivity with organic solutes, indicating that such draws can be used for FO To evaluate the use of IL draws in a practical application, real produced water feeds were obtained from two different oil fields operated by the California Resources Corporation (Elk Hills and South Mtn). These samples contain salts, metals, organic contaminants, and acids, although sodium and chloride ions form the largest mass fraction of dissolved matter. Accordingly, sodium chloride equivalents of Elk Hills (~0.35 M) and South Mountain (~0.5 M) were first prepared and tested as feed solutions, followed by real produced water samples. This enabled evaluation of the effect of salinity alone on the draw ability of IL-water mixtures, without complex interactions that can occur with real samples given their heterogeneous composition (e.g., volatile organics and suspended solids). Based on the osmolality of produced water samples and their NaCl equivalents, a 70 wt % TFA and 70 wt % DMBS draw solution was selected as they exhibit higher osmotic pressure than these feeds.

FIG. 4C shows the desalination performance of both IL-based draws, with TFA yielding a higher water flux in all cases owing to its higher osmolality and lower viscosity when compared to DMBS. The flux from real produced water is slightly lower than its salt equivalent, which indicates the presence of components that do not contribute to osmotic strength but influence water flux. We note that these results can be further improved by lowering mass transport resistances (e.g., higher cross-flow velocities and well-designed hydrodynamics) in the cell, and should be considered to realize the potential of organic draws in FO. Recent experiments yielded a water flux of ~5 LMH initially, which decreased to 2 LMH at 40% water recovery.

To assess the compatibility of commercial membranes with IL draws and produced water feeds, SEM-EDX analysis was performed. A fresh membrane was compared with a membrane used for six FO experiments using both ILs, after which it was rinsed with DI water for 30 minutes and then imaged. EDX shows residual IL (<2 wt %) present in micro-pores of the support layer that was in contact with the draw, while residual inorganic elements from the produced water feed is present in the active layer, but the total levels are lower than 1 wt %. These experiments confirm that the membrane can be reused after rinsing or backwashing with DI water, as no significant decrease in flux was observed over multiple runs with the reused membrane. Thus, commercial FO membranes are compatible with the two chosen LCST ionic liquids and can be used for FO desalination of feeds that have high fouling potential.

Example—Solar-Thermal IL Draw Regeneration Via Radiative Heating

After the FO membrane step, the diluted draw solutions ~40-50 wt % (based on NMR analysis) undergo phase separation by heating to temperatures above LCST using solar energy; this yields product water and concentrated IL, which is recycled for a subsequent FO process. Solar energy can either be harnessed indirectly (absorbed by a solid surface or a heat transfer fluid) or directly via absorption of light by the liquid. In the first case, a heat exchanger is required to transfer heat to the draw via conduction and convection, which not only has surfaces that are susceptible to scaling and corrosion over time, but also adds to the system cost. In contrast, direct absorption of radiation by the liquid is an efficient and non-contact heating method that depends only on the spectral optical properties of IL-water mixtures. However, these properties are unknown since these thermo-responsive ILs have not been used with solar energy before. To this end, we performed spectroscopy over a wide wavelength range to characterize the absorption of the two IL-water mixtures as a function of concentration.

Figure 5A:
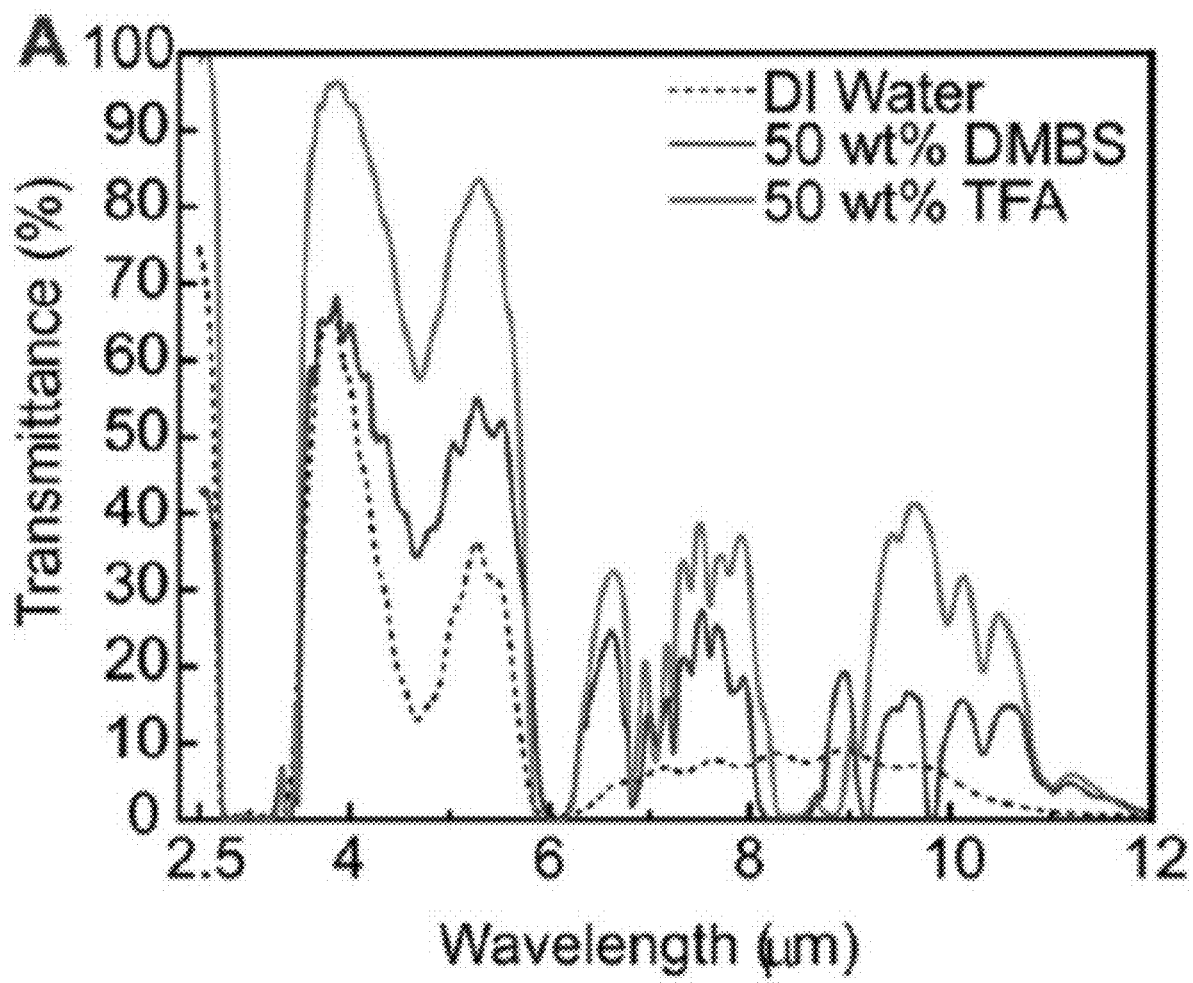
FIGS. 5A-5F show examples of experimental testing of draw regeneration using a photonic heater that converts solar energy into infrared radiation for heating above the LCST.

Pure ILs are transparent across the solar spectrum, much like water which absorbs weakly at visible wavelengths. At infrared wavelengths however, pure ILs show multiple absorption bands corresponding to vibrations modes of constituent chemical functional groups; given that water's O—H bond strongly absorbs at ca. 2.8 μm, it is expected that IL-water mixtures will also absorb across the near- and mid-IR region. The infrared transmittance of IL-water mixtures was measured, and the results are shown in FIG. 5A for both 50 wt % DMBS and TFA; the transmittance of DI water is also measured and matches literature data. For both mixtures, strong absorption in the short-infrared (2.5-3 μm) and mid-infrared (6-8 μm) corresponds to vibrational and rotational modes of the pure IL molecules. Thus, by converting solar energy into infrared radiation, direct absorption by the liquid can induce phase separation, i.e., draw regeneration. This can be achieved using a photonic heater that absorbs solar irradiation and re-emits at infrared wavelengths that overlap with the absorption spectrum of aqueous IL mixtures, vide infra. Mid-IR wavelengths correspond to thermal emission from a blackbody above room temperature, which can be heated using unconcentrated sunlight.

Figure 5B:
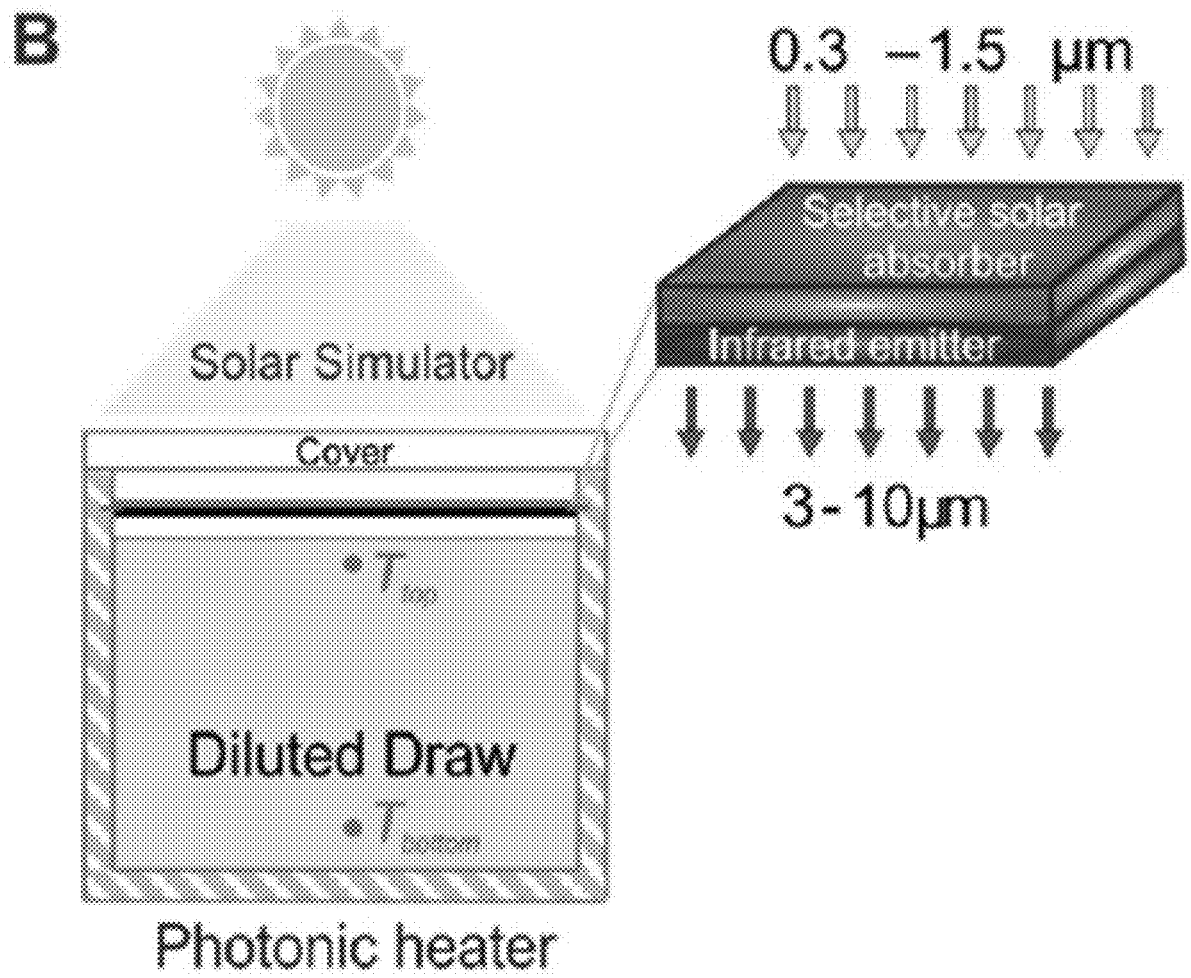
Figure 5C:
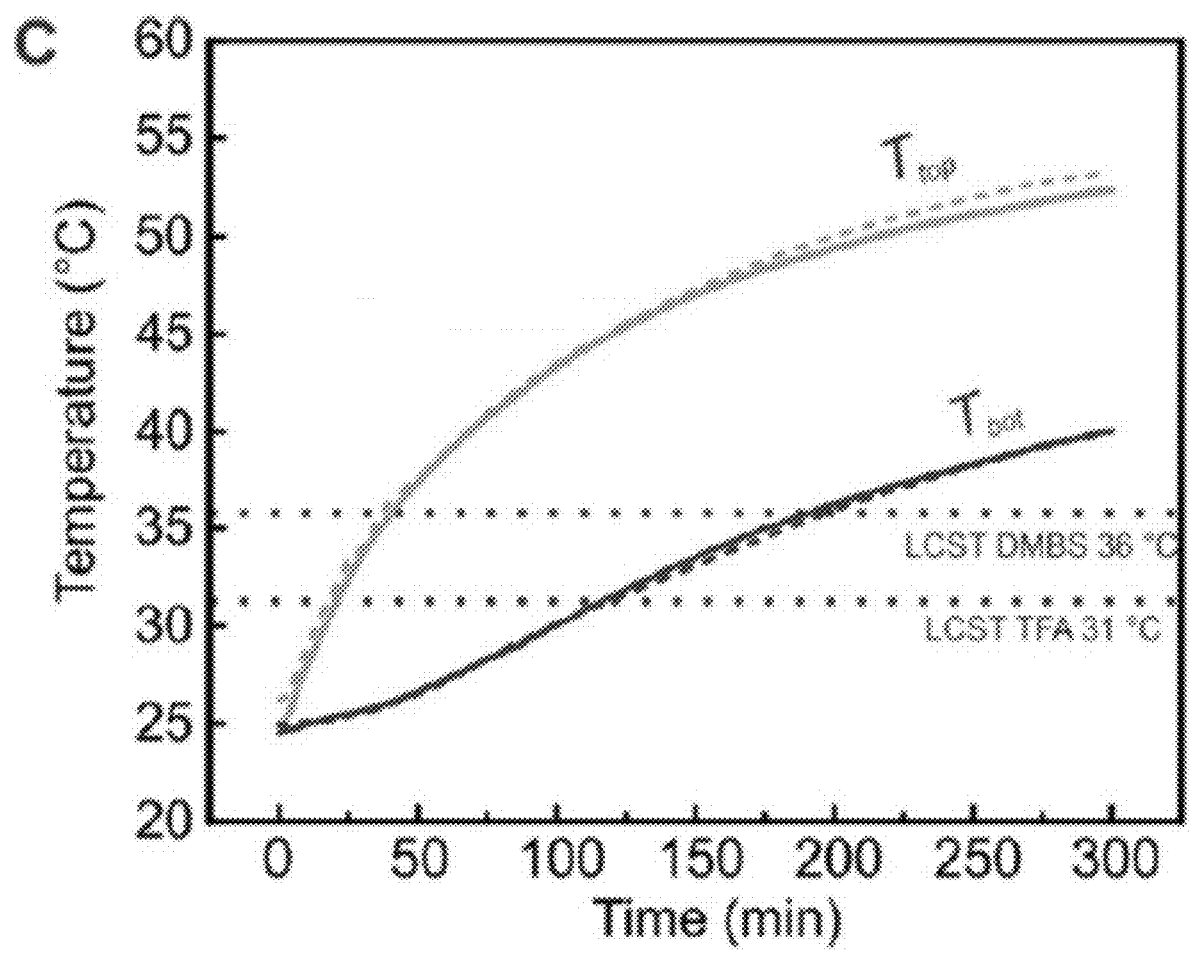

For a lab-scale demonstration of this draw regeneration concept, diluted draws of TFA and DMBS from produced water desalination were each transferred into an insulated acrylic vessel and placed under a solar simulator. The photonic heater, comprising a selective solar absorber and a blackbody emitter, was placed above the vessel; thermocouples recorded temperatures of the heater and the liquid, as shown in FIG. 5B. Upon illumination at 1000 W m$^{-2}$ (corresponds to one-sun solar flux), the absorber temperature rapidly increases to 80° C. as incident sunlight is converted into thermal radiative energy. This heat is transferred to the emitter, causing it to emit as a blackbody at a peak wavelength of ~8 µm matching the spectral absorption profile of IL-water mixtures. This radiative coupling allows for direct absorption of thermal emission by the underlying liquid, resulting in a temperature increase well-above the LCST, as shown in FIG. 5C.

Figure 5D:
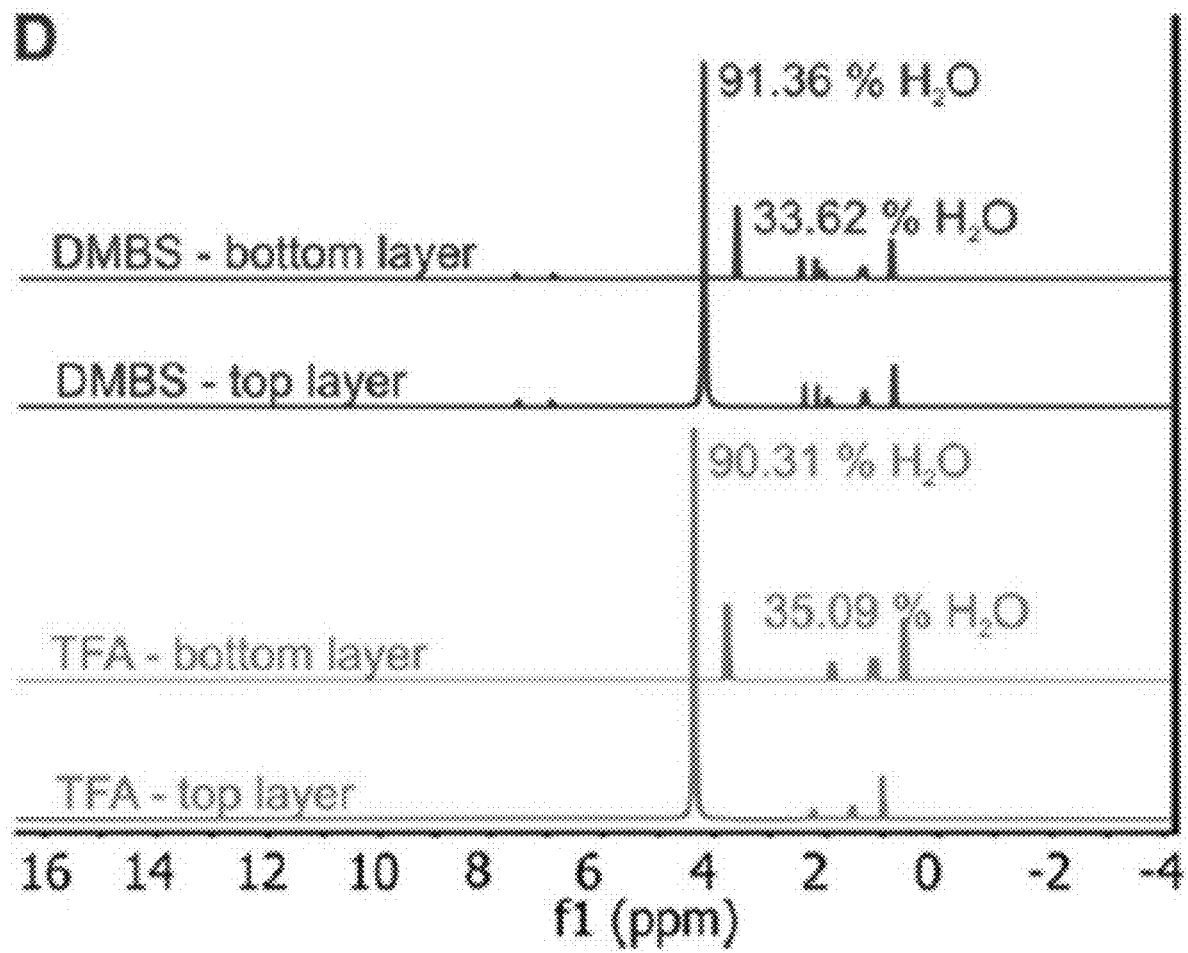

To verify the extent of phase separation, aliquots of the heated mixture were analyzed for their composition, where the top layer comprises a water-rich phase and bottom layer is the IL-rich phase as shown FIG. 5D. Residual amounts of IL ~10 wt % in the water-rich phase can be removed by a nanofiltration (NF) post-treatment process with a small external pressure input, and the IL-rich phase >65 wt % can be reused as draw in the FO module. We note that NF is necessary as heating alone cannot remove IL aggregates that remain in water as shown in the MD simulations; this indicates the need for designing new IL chemistries that exhibit a very broad phase diagram.

Figure 5E:
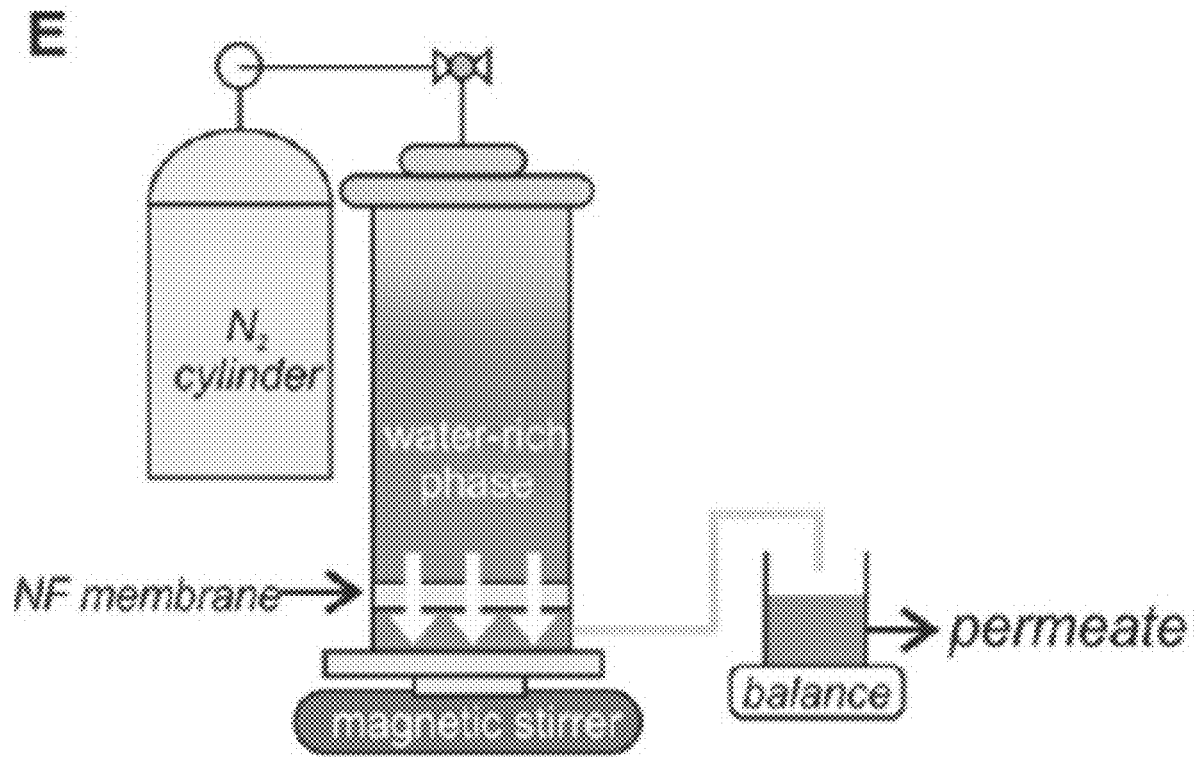

To assess the performance of commercial NF membranes with these ILs, a dead-end filtration setup was designed with a stirred cell with an NF270 polyamide membrane, as shown in FIG. 5E. The pressure required for NF is dictated by the osmotic pressure of the water-rich phase, which was measured and a pressure of 12 bar was applied.

Figure 5F:
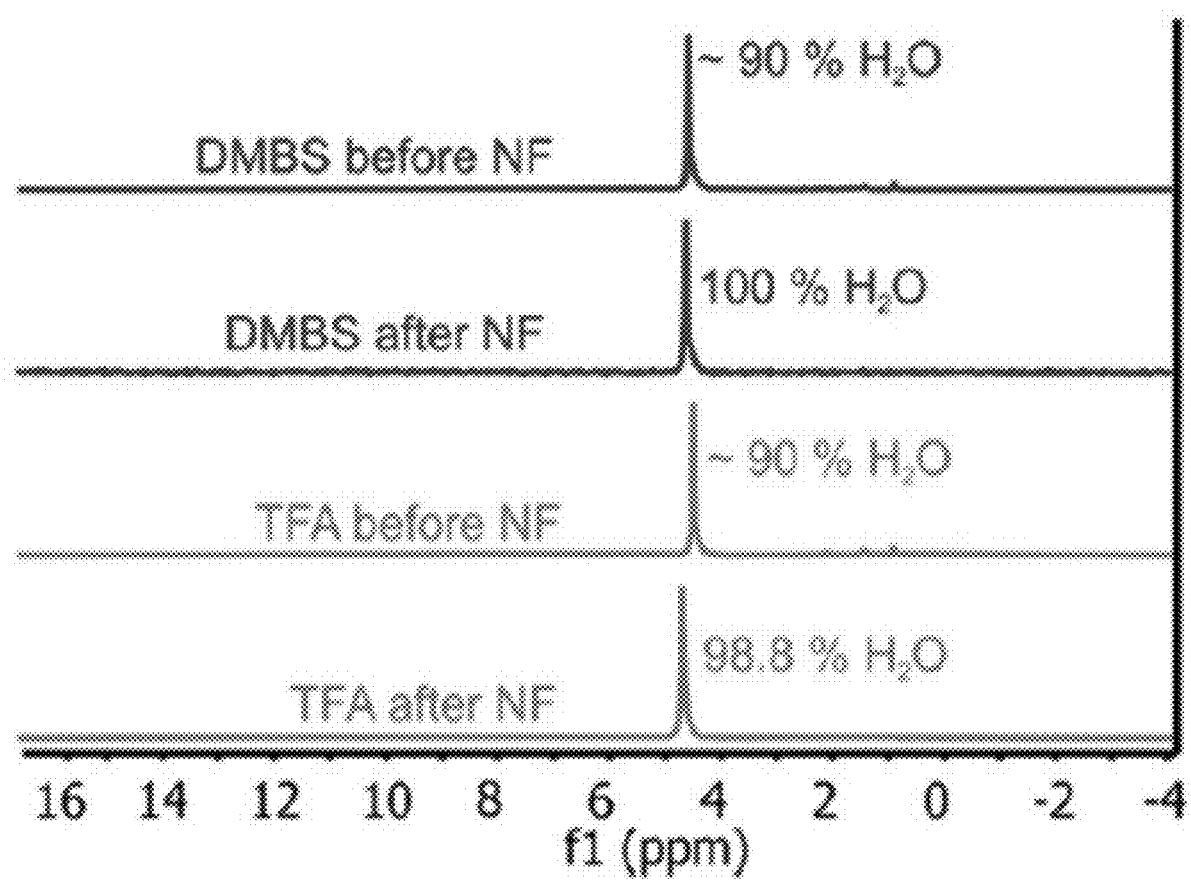

Analysis of the permeate reveals near-perfect rejection of both ILs, with a water content of 100 wt % for DMBS and 98.8 wt % for TFA, as shown in FIG. 5F. These experiments are the first demonstration of utilizing solar heat as the energy input for draw regeneration after produced water desalination, thus yielding high-quality water for beneficial reuse.

Example—Energy Efficiency and Design Optimization

An embodiment of an integrated solar-FO system is shown in FIG. 1A that comprises draw dilution in the FO module (commercially available from different vendors) and draw regeneration in the thermal separator (custom designed based on draw solution properties). Given that the FO step is spontaneous, the only energy input required is electricity for circulating the feed and draw solutions, estimated ~0.5 kWh m$^{-3}$ based on previous studies. If high-quality product water is desired, a nanofiltration module can be used to reject residual ILs using electricity; an applied pressure of 12 bar consumes ~0.3 kWh m$^{-3}$. This yields an overall electrical energy consumption of <1 kWh m$^{-3}$, which is even lower than RO-based seawater desalination that consumes ~3 kWh m$^{-3}$. This is because the primary energy consumption in our system is the heat required for phase separation of the IL-water mixture. It is important to emphasize that this heat input (comprising sensible heating to a temperature above LCST and $\Delta H_{mix}$) comes from solar energy that is converted to infrared radiation with a photonic heater. Here, the solar-thermal conversion efficiency ($\eta$) becomes important and dictates the design of the separator. This efficiency is defined as:

$$\eta = \frac{\dot{m}(C_p \Delta T + \Delta H_{mix})}{q_{solar} A} = \eta_1 \times \eta_2 \quad (1)$$

where $\dot{m}$ is the mass flow rate, $C_P$ is the specific heat capacity of the diluted draw, $\Delta T$ is the difference between the initial and final temperatures of the mixture, $\Delta H_{mix}$ is the enthalpy of liquid-liquid separation or de-mixing <10 J g$^{-1}$ (negligible compared to $C_p \Delta T$), A is the area of the photonic heater, and $q_{solar}$ is the incident solar flux.

There are two parts to this efficiency: $\eta_1$ represents the photo-thermal conversion efficiency of the heater, and $\eta_2$ represents the radiative coupling between the heater and the underlying liquid, as well as the absorption efficiency of the IL-water mixture. These efficiencies guide the design of the two sub-components of the separator. Maximizing $\eta_1$ necessitates the use of a selective solar absorber with a high solar absorptivity and low thermal emissivity that converts incoming sunlight into heat, as well as an emitter with a high infrared emissivity that radiates to the underlying liquid. The spectral properties of the selective solar absorber and the blackbody emitter demonstrated in this work satisfy these criteria to yield $\eta_1$~91% owing to optical losses due to reflection (5%) and thermal emission (4%) from the selective absorber surface.

Maximizing $\eta_2$ requires a strong radiative coupling between the emitter and liquid, which can be can be achieved with a radiation view factor close to unity and minimal thermal losses (e.g., convection from the heater and liquid surfaces and conduction to the walls of the vessel). Maximizing $\eta_2$ also requires matched emission from the heater with spectral properties of the IL-water mixture. Furthermore, to ensure rapid heating, the radiation penetration depth should be comparable to the thermal mass of the liquid. A view factor for radiative coupling ~0.8 was achieved in this work by placing the heater close to the surface of the liquid, and spectral property matching was made possible by blackbody emission at 80° C. (temperature attained by the photonic heater in our experiments) which has a peak wavelength ~8 µm that overlaps with measured absorption profile of the liquid.

As the thermal losses cannot be measured experimentally, a 2D multi-physics thermal model was developed to estimate losses and determine $\eta_2$. This model reveals that convection losses from the top surface of the heater and absorption of the emitted heat by top layers of the liquid result in $\eta_2$~55%. As a result, the overall solar-thermal efficiency for the system is 50%, which represents a lower performance bound as it is possible to optimize the design. For instance, higher heater temperatures can be attained by reducing convection losses from its surface (e.g. using insulation, multi-layer convection shields, vacuum), which consequently increases the radiative power incident on the IL-water mixture. The dimensions of the separator, i.e., its thickness can also be modified to match the thermal penetration depth of incoming infrared radiation, which enables temperatures well-above LCST in under an hour. With these design improvements, a solar-thermal conversion efficiency of 69% is obtained due to direct volumetric absorption of radiation by the liquid. We note that the use of solar energy for heating the IL-water mixture without a photonic heater would result in an efficiency under 20% due to the poor absorption of sunlight by these materials. The design described herein enables a continuous desalination process, in which the IL-water mixture flows through a 1" tube that is symmetrically heated by the photonic heater. In this case, a sufficient residence time must be provided for formation of the two-phase mixture by gravity separation; a coalescer (widely used in the oil and gas industry) may be employed to expedite the phase separation process with an additional electrical energy consumption <1 kWh m$^{-3}$.

Example—Synthesis of ILs $P_{4444}$DMBS was prepared by using a neutralization reaction. The starting materials were 2,4-dimethylbenzenesulfonic acid and tetrabutyl-phosphonium hydroxide. In water, both reagents were mixed in a 1:1 molar ratio, with a slight excess of the sulfonic acid and stirred at room temperature for 24 hours. After mixing, the solution exhibits a cloudy off-white color that is indicative of the formation of IL. The solution was then added to a separatory funnel and extracted with dichloromethane; this step was repeated three times. The organic phase was collected and washed with water three times and collected again. The organic phase was then transferred to a rotary evaporator in order to remove the dichloromethane from the IL. The resultant IL solution was then stored in a vacuum oven at 90° C. for 48 hours to remove any residual water, thereby producing pure $P_{4444}$DMBS. The $^1$H-NMR spectra of $P_{4444}$DMBS in d-DMSO (δ/ppm relative to TMS) showed: δ=0.81-0.93 (12H; a), 1.29-1.54 (16H; b, c), 2.05-2.18 (8H, d), 2.18 (3H, g), 2.45 (3H, e), 6.78-6.94 (2H; f, h), 7.52-7.61 (1H, i).

$P_{4444}$TFA was prepared using a neutralization reaction with tetrabutyl-phosphonium hydroxide and trifluoroacetic acid. Tetrabutyl-phosphonium hydroxide was added to water and stirred. To this solution, trifluoroacetic acid was added drop-wise over the course of several hours to ensure that the reaction went to completion, as well as to prevent pH from decreasing too rapidly. After full addition of acid, the aqueous solution was mixed at room temperature for 24 hours. The solution was then worked up using dichloromethane extraction, and then dried in the vacuum oven, as described for DMBS. The resultant IL was clear in color. $^1$H-NMR was performed (DMSO, δ/ppm relative to TMS): δ=0.78-0.98 (3H; a), 1.25-1.51 (4H; b,), 2.03-2.19 (2H, c).

CONCLUSION

Thermo-responsive ionic liquids are promising draw solutes for forward osmosis desalination as their low enthalpy of phase separation from water requires substantially less energy than conventional unresponsive draws like NaCl. In this work, we demonstrated a concept that leverages this unique phase behavior in aqueous solution and strong absorption in the infrared to enable continuous draw recycling and clean water production using only a solar energy input. To harness solar heat, a low-cost photonic heater was designed that converts solar irradiation into infrared emission that is directly absorbed by the IL-water mixture to induce phase separation by heating above the LCST. Desalination of real produced water feeds was experimentally demonstrated, with the relatively large size of the organic moieties of IL resulting in a low reverse solute flux compared to other draws. According to the proposed design concept, a solar-thermal conversion efficiency of 50% was obtained, which can be increased further with thermal design as predicted by our modeling. The ability to harness unconcentrated solar energy for desalination of high salinity feeds addresses a major challenge for FO, i.e., the energy intensity of draw regeneration. As such, this work opens new avenues to achieve high performance desalination by designing emitters with tailored spectral emissivity to match absorption properties of different draws or new ILS with functional groups that enable direct radiative heating for phase separation. This demonstrates a practical solution for low-cost and on-site water treatment.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:
1. A method comprising:
generating a diluted draw solution using forward osmosis, wastewater being on a first side of an osmotic membrane and a draw solution being on a second side of the osmotic membrane, the draw solution comprising a mixture of water and an ionic liquid, water in the wastewater diffusing across the osmotic membrane to the draw solution to form the diluted draw solution, and during the generating operation cooling the wastewater and the draw solution to a first temperature;
in a flow separator, heating the diluted draw solution using a photonic heater to a second temperature above a lower critical solution temperature (LCST) of the ionic liquid; and
in a separation vessel, allowing the diluted draw solution to phase separate into the ionic liquid and treated water.

2. The method of claim 1, wherein the ionic liquid generated by the phase separation of the diluted draw solution is used as the draw solution in the forward osmosis in the generating operation.

3. The method of claim 1, further comprising:
after allowing the diluted draw solution to phase separate, filtering the treated water to remove residual ionic liquid from the treated water.

4. The method of claim 1, wherein the ionic liquid is an ammonium-based ionic liquid, a phosphonium-based ionic liquid, or a mixture thereof.

5. The method of claim 1, wherein the lower critical solution temperature of the ionic liquid is under about 70° C.

6. The method of claim 1, wherein a density of the ionic liquid above the lower critical solution temperature is higher than a density of water, and wherein when the diluted draw solution is phase separated into the ionic liquid and the treated water, the treated water floats on top of the ionic liquid.

7. The method of claim 1, wherein the draw solution in the generating operation Ea has a weight percentage of the ionic liquid of about 10% to 90%.

8. The method of claim 1, wherein the diluted draw solution generated in the generating operation Ea has a weight percentage of the ionic liquid of about 30% to 50%.

9. The method of claim 1, wherein the photonic heater converts solar radiation into infrared radiation of specific wavelengths for heating the diluted draw solution.

10. The method of claim 1, wherein the second temperature is about 50° C. to 60° C.

11. The method of claim 1, wherein the flow separator includes a serpentine channel for the diluted draw solution.

12. The method of claim 11, wherein a flow of the diluted draw solution in the serpentine channel is about perpendicular to a surface of photonic heater which is illuminated by the sun.

13. The method of claim 9, wherein the photonic heater comprises a metal substrate, an infrared emitter disposed on a first side of the metal substrate, and a solar absorber disposed on a second side of the metal substrate.

14. The method of claim 13, wherein the metal substrate comprises aluminum or copper, wherein the solar absorber is black paint, and wherein the infrared emitter comprises a cermet structure comprising a ceramic matrix with metal nanoparticles embedded in the ceramic matrix.

15. The method of claim 1, wherein the first temperature is about 25° C.

16. The method of claim 1, wherein cooling the wastewater is performed using a first heat exchanger, and wherein cooling the draw solution is performed using a second heat exchanger.

17. A method comprising:
generating a diluted draw solution using forward osmosis, wastewater being on a first side of an osmotic membrane and a draw solution being on a second side of the osmotic membrane, the draw solution comprising a mixture of water and an ionic liquid, water in the wastewater diffusing across the osmotic membrane to the draw solution to form the diluted draw solution, and during the generating operation cooling the wastewater and the draw solution to a first temperature; and
heating the diluted draw solution using a photonic heater to a temperature above a lower critical solution temperature (LCST) of the ionic liquid to phase separate the diluted draw solution into the ionic liquid and treated water, the photonic heater converting solar radiation into infrared radiation of specific wavelengths at which the diluted draw solution absorbs the infrared radiation and increases in temperature, the specific wavelengths being about 3 microns to 10 microns.

18. A system comprising:
a forward osmosis apparatus including an osmotic membrane, the forward osmosis apparatus operable to treat wastewater with the wastewater on a first side of the osmotic membrane and a draw solution on the second side of the osmotic membrane, the draw solution comprising a mixture of water and an ionic liquid, water in the wastewater diffusing across the osmotic membrane to the draw solution to form a diluted draw solution;
a flow separator including a photonic heater, the flow separator being coupled to the forward osmosis apparatus to receive the diluted draw solution and operable to heat the diluted draw solution with the photonic heater above a lower critical solution temperature (LCST) of the ionic liquid;
a separation vessel operable to allow the diluted draw solution to phase separate into the ionic liquid and treated water; and
a first heat exchanger coupled to the forward osmosis apparatus operable to cool the wastewater to a specific temperature, and a second heat exchanger coupled to the forward osmosis apparatus operable to cool the draw solution to the specific temperature.

19. The system of claim 18, further comprising:
a filtration apparatus coupled to the forward osmosis apparatus, the filtration apparatus operable to filter the wastewater before it is treated in the forward osmosis apparatus.

20. The system of claim 18, further comprising:
a nanofiltration apparatus coupled to the separation vessel, the nanofiltration apparatus operable to remove residual ionic liquid from the treated water.

* * * * *